United States Patent
Jalbert

(10) Patent No.: US 11,660,782 B2
(45) Date of Patent: May 30, 2023

(54) PROCESS, APPARATUS AND SYSTEM FOR CREATING EXTRUDED MATERIAL HAVING COLOR EFFECTS AND PRODUCTS MADE WITH EXTRUDED MATERIAL CREATED WITH SAME

(71) Applicant: PELICAN INTERNATIONAL INC., Laval (CA)

(72) Inventor: Steve Jalbert, Montreal (CA)

(73) Assignee: PELICAN INTERNATIONAL INC., Laval (CA)

( * ) Notice: Subject to any disclaimer, the term of this patent is extended or adjusted under 35 U.S.C. 154(b) by 678 days.

(21) Appl. No.: 16/016,178

(22) Filed: Jun. 22, 2018

(65) Prior Publication Data

US 2019/0322026 A1 Oct. 24, 2019

Related U.S. Application Data

(60) Provisional application No. 62/661,377, filed on Apr. 23, 2018.

(51) Int. Cl.
*B29C 48/08* (2019.01)
*B29C 48/30* (2019.01)
(Continued)

(52) U.S. Cl.
CPC .............. *B29B 7/603* (2013.01); *B01F 23/47* (2022.01); *B01F 27/1143* (2022.01);
(Continued)

(58) Field of Classification Search
CPC ....... B29C 48/08; B29C 48/09; B29C 48/175; B29C 48/30; B29C 48/49; B29C 48/70;
(Continued)

(56) References Cited

U.S. PATENT DOCUMENTS 2,174,779 A 10/1939 Delorme
2,632,204 A 3/1953 Murray
(Continued)

FOREIGN PATENT DOCUMENTS

CA 2442187 3/2005
CA 2916287 1/2018
(Continued)

OTHER PUBLICATIONS

Examiner's Report dated Dec. 19, 2016 in connection with Canadian Patent Application No. 2,916,287, 5 pages.
(Continued)

*Primary Examiner* — Xiao S Zhao
*Assistant Examiner* — Joseph S Leyson
(74) *Attorney, Agent, or Firm* — Morgan, Lewis & Bockius LLP

(57) ABSTRACT

A process and associated system for creating color effects using extrudable material, such as plastic and metal for example, are presented. Flows of first and second viscous materials of respective colors are provided and then combined in a predetermined pattern to form a stream of combined viscous material. A dynamic mixer is the then used to apply a predetermined dividing, overturning and combining motion to the stream of combined viscous material to partially mix the first viscous material and the second viscous material, such that upon exiting the dynamic mixer, the first material of the first color and the second material of the second color form a color pattern in the stream of combined viscous material. The dynamic mixer has elements configured for acquiring a specific radial orientation in a range of radial orientations that may be varied during the application of the dividing, overturning and combining motion to the stream of combined viscous material to cause variations in the color pattern in the stream of combined
(Continued)

viscous material. Sheets of extruded material may be created using such process and system and used in the manufacturing of many different products including, but not limited to, kayaks, stand-up paddle boards, garden furniture and many others. In some embodiments, the sheets may be characterized by color bands extending diagonally with reference to a longitudinal extent of the sheet.

18 Claims, 19 Drawing Sheets

(51) Int. Cl.
| | | |
|---|---|---|
| B29C 48/17 | (2019.01) | |
| B29C 48/71 | (2019.01) | |
| B29C 48/09 | (2019.01) | |
| B29B 7/60 | (2006.01) | |
| B63B 5/24 | (2006.01) | |
| B29C 48/49 | (2019.01) | |
| B29C 48/00 | (2019.01) | |
| B63B 34/20 | (2020.01) | |
| B01F 23/47 | (2022.01) | |
| B01F 27/1143 | (2022.01) | |
| B01F 35/221 | (2022.01) | |
| B29C 48/92 | (2019.01) | |
| B29K 101/12 | (2006.01) | |
| B29L 31/30 | (2006.01) | |
| B01F 101/00 | (2022.01) | |

(52) U.S. Cl.
CPC .. B01F 35/221422 (2022.01); B29C 48/0017 (2019.02); B29C 48/08 (2019.02); B29C 48/09 (2019.02); B29C 48/175 (2019.02); B29C 48/30 (2019.02); B29C 48/49 (2019.02); B29C 48/71 (2019.02); B29C 48/92 (2019.02); B63B 5/24 (2013.01); B63B 34/20 (2020.02); *B01F 2101/2805* (2022.01); *B29C 2948/92752* (2019.02); *B29K 2101/12* (2013.01); *B29K 2995/0021* (2013.01); *B29L 2031/307* (2013.01)

(58) Field of Classification Search
CPC .................. B29C 48/71; B29C 48/92; B29C 2948/92752; B29B 7/603; B01F 35/221422
See application file for complete search history.

(56) References Cited

U.S. PATENT DOCUMENTS

| | | | |
|---|---|---|---|
| 2,803,041 | A | 8/1957 | Hill et al. |
| 2,985,556 | A | 5/1961 | Rowland |
| 3,405,425 | A | 10/1968 | Buckley et al. |
| 3,422,175 | A | 1/1969 | Rowland |
| 3,639,573 | A | 2/1972 | Port et al. |
| 3,715,420 | A | 2/1973 | Kiyono et al. |
| 3,743,250 | A | 7/1973 | Fitzhugh, Jr. et al. |
| 3,769,380 | A | 10/1973 | Wiley |
| 3,778,207 | A | 12/1973 | Luraschi et al. |
| 3,792,945 | A | 2/1974 | Randall |
| 3,920,366 | A | 11/1975 | Randall |
| 4,011,292 | A | 3/1977 | Randall |
| 4,072,791 | A | 2/1978 | Randall |
| 4,093,188 | A | 6/1978 | Horner |
| 4,164,385 | A | 8/1979 | Finkensiep |
| 4,316,868 | A | 2/1982 | Esposito et al. |
| 4,562,023 | A | 12/1985 | Pabst et al. |
| 4,626,187 | A | 12/1986 | Kamada |
| 4,680,155 | A | 7/1987 | Rochefort et al. |
| 4,753,766 | A | 6/1988 | Pinsolle |
| 5,232,751 | A | 8/1993 | Cameron et al. |
| 5,998,006 | A | 12/1999 | Bambara et al. |
| 6,692,683 | B2 | 2/2004 | Gockel et al. |
| 6,863,967 | B2 | 3/2005 | Cramer |
| 6,878,319 | B2 | 4/2005 | Browne et al. |
| 6,932,591 | B2 | 8/2005 | Cramer |
| 7,204,944 | B2 | 4/2007 | Piedboeuf |
| 8,557,151 | B2 | 10/2013 | Lipson et al. |
| 9,452,560 | B2 | 9/2016 | Kalkanoglu et al. |
| 9,527,314 | B2 | 12/2016 | Moriguchi et al. |
| 9,527,341 | B2 | 12/2016 | Rassi et al. |
| 2002/0058082 | A1 | 5/2002 | Muirhead |
| 2003/0003283 | A1 | 1/2003 | Cramer |
| 2010/0129622 | A1 | 5/2010 | Kalkanoglu et al. |
| 2012/0213897 | A1 | 4/2012 | Meyer et al. |
| 2013/0069268 | A1 | 3/2013 | Liu et al. |
| 2013/0224437 | A1 | 8/2013 | Park et al. |
| 2015/0017387 | A1 | 1/2015 | Park et al. |
| 2018/0107351 | A1* | 4/2018 | Lang ..................... G06F 3/0488 |
| 2018/0304516 | A1* | 10/2018 | Strachan ............. B29C 48/0017 |
| 2018/0326619 | A1 | 11/2018 | Lemay et al. |

FOREIGN PATENT DOCUMENTS

| | | |
|---|---|---|
| CA | 2979855 | 11/2018 |
| JP | H04-029820 | 1/1992 |
| WO | WO 02/074843 | 9/2002 |

OTHER PUBLICATIONS

Examiner's Report dated Jul. 21, 2017 in connection with Canadian Patent Application No. 2,916,287, 3 pages.
Notice of Allowance dated Oct. 26, 2017 in connection with Canadian Patent Application No. 2,916,287, 1 page.
Notice of Allowance dated Feb. 6, 2018 in connection with Canadian Patent Application No. 2,979,855, 1 page.
Restriction Requirement dated Mar. 19, 2018 in connection with U.S. Appl. No. 14/757,943, 10 pages.
Office Action dated Jun. 20, 2018 in connection with U.S. Appl. No. 14/757,943, 38 pages.
Final Office Action dated May 1, 2019 in connection with U.S. Appl. No. 14/757,943, 18 pages.
Examiner's Report dated Jun. 18, 2019, in connection with Canadian Patent Application No. 3,009,013, 10 pages.
Final Office Action dated Nov. 2, 2018 in connection with U.S. Appl. No. 14/757,943—15 pages.
Office Action dated Jan. 23, 2019 in connection with U.S. Appl. No. 14/757,943—17 pages.
Examiner's Report dated Jul. 22, 2019 in connection with Canadian Patent Application No. 2,987,836—3 pages.
Notice of Allowance dated Sep. 3, 2019 in connection with U.S. Appl. No. 14/757,943—7 pages.

* cited by examiner

Without Flowrate Variations

With Flowrate Variations

PROCESS, APPARATUS AND SYSTEM FOR CREATING EXTRUDED MATERIAL HAVING COLOR EFFECTS AND PRODUCTS MADE WITH EXTRUDED MATERIAL CREATED WITH SAME

CROSS-REFERENCES TO RELATED APPLICATION

This application claims the benefit of priority under 35 U.S.C. 119(e) based upon U.S. provisional application Ser. No. 62/661,377 filed Apr. 23, 2018. The contents of the above referenced application are incorporated herein by reference.

FIELD OF THE INVENTION

The present invention relates generally to the field of extrusion processes and extruded materials created using such processes, including for example plastic or metal materials. More specifically, the present invention relates to processes and associated apparatuses and systems for creating extruded materials (such as for example but without being limited to sheets and tubes) having color effects as well as to products made with extruded materials having color effects created using such processes.

BACKGROUND

Extrusion processes are commonly used in a variety of different industries, and with a multitude of different types and grades of material, for forming and shaping these materials into articles.

Extruded products, whether plastic, metal or some other material, are often uniform in color. In some cases, the extruded products are formed of several layers of material, including one or more visible, outer layers and one or more hidden, inner layers, where these layers may differ in color.

In today's competitive market place, it is important for companies to have an edge that distinguishes their product from a competitor's product. One way to create a product that distinguishes itself from a competitor's product is to provide the product with an aesthetically pleasing and/or original appearance. Consumers are typically attracted to products having a visually appealing look.

In the field of extruded products, one method for giving the end products a visually appealing look is to create special color effects in the material of the product. Existing methods for producing color effects in extruded material, such as plastic for example, include lamination techniques, wherein multiple different layers of colored material are joined together to form a multi-colored sheet, and imprinting techniques wherein an imprinted film is adhered to the material. Unfortunately, these processes require treating the material after it has been extruded and formed. This can be both costly and time consuming.

Other methods, such as the one described for example in U.S. Pat. No. 7,204,944, allow producing color effects in the extruded material by combining flows of viscous material of multiple colors and using a static mixer during the extrusion process to form a stream of viscous material. The contents of the aforementioned documents are incorporated herein by reference. While approaches of the type described above may allow creating extruded material having a pleasing and original visual appearance, the visual effects that may be produced tend to be limited. Another approach for obtaining other original color effects is described in U.S. patent application publication no. US20170182697 A1. The contents of the aforementioned documents are incorporated herein by reference. However, in this case as well, the visual effects that may be produced also tend to be limited. In order to attract the attention of consumers, it is desirable to create a variety of original color effects in extruded materials include some that may differ from those that may be created by methods of the type proposed in U.S. Pat. No. 7,204,944 and U.S. patent application publication no. US20170182697 A1.

As such, a need exists in the industry to provide methods for producing visually appealing color effects in extruded material, such as plastic and metal.

SUMMARY

In accordance with a first aspect, a process for creating color effects using extrudable material is described. The process comprises:
 a) providing a flow of a first viscous material of a first color;
 b) providing a flow of a second viscous material of a second color different from the first color;
 c) combining in a predetermined pattern the flow of the first viscous material and the flow of the second viscous material to form a stream of combined viscous material, the stream comprising a first band of the first color and a second band of the second color, the second band being adjacent to the first band;
 d) feeding the stream of combined viscous material through a dynamic mixer configured for applying a dividing, overturning and combining motion to said stream of combined viscous material to partially mix the first viscous material and the second viscous material, such that such that upon exiting the dynamic mixer, the first material of the first color and the second material of the second color form a color pattern in the stream of combined viscous material, wherein said dynamic mixer has elements configured for acquiring a specific radial orientation in a range of radial orientations, said process comprising varying the specific radial orientation of the elements of the dynamic mixer during the applying of the dividing, overturning and combining motion to the stream of combined viscous material to cause variations in the color pattern in the stream of combined viscous material.

In some specific practical implementations, the first band and second band may remain in the stream of combined viscous material, which may further include a third band of a third color that is different from the first and second colors. The first band, the second band and the third band may be twisted with one another in the stream of combined viscous material as a result of the varying the specific radial orientation of the elements of the dynamic mixer.

In some specific implementations, the varying the specific radial orientation of the elements of the dynamic mixer may include performing a rotation of the elements of the dynamic mixer by a pre-determined amount to vary the specific radial orientation of the elements of the dynamic mixer during the applying of the dividing, overturning and combining motion to the stream of combined viscous material. The rotation may be performed repeatedly over time, either at regular (fixed) or variable time intervals. The angle of rotation may vary widely for example it may be greater than 0° and less than or equal to 360°; between 30° and 130°; between 45° and 110°. In a non-limiting example, the angle of rotation is about 90°. In other specific practical non-limiting implementations, the pre-determined rotation amount may be a rotation of about 45°, 135° or 180°. It is to be appreciated that the rotation may be performed clock-wise or counter clock-wise and may in fact alternate between one or more clockwise rotations and one or more counter clock wise rotations in order to produce different color patterns in the stream of combined viscous material.

In some specific implementations, the varying the specific radial orientation of the elements of the dynamic mixer may include causing the rotational position to vary substantially continuously over a time interval. The rotational position of the dynamic mixer has a rate of change over time defining a rotational speed of the dynamic mixer, which may either remain substantially constant over time or which may instead vary.

In a specific, non-limiting example of implementation, processes of the type described above may be implemented in a system for manufacturing extruded plastic sheets. The system may include a die, a feed block, a dynamic mixer and at least two extruders. The extruders may each be configured to mix and heat plastic granules, for producing a generally homogeneous, viscous plastic mixture. In the context of the present invention, at least two of the extruders produce plastic mixtures of different colors and of different viscosities. The feed block is configured to combine the flows of viscous plastic released by the different extruders into a single stream of combined viscous material. The single stream of viscous plastic generated by the feed block may then be fed through the dynamic mixer pipe. The dynamic mixer pipe is configured to act on the single stream of combined viscous material to partially mix the stream and create a color pattern in the stream of combined viscous material. The die receives the partially mixed stream of combined viscous material and may be configured to shape the stream into its final product form, such as a sheet or a tube, among many other possibilities. In some implementation, the stream of combined viscous material may optionally be passed through a second feed block to combine the partially mix the stream with one or more additional streams of viscous material before it is sent to the die.

In accordance with another aspect, a system for creating color effects using extrudable material is provided, the system comprising:
a) a first extruder for providing a flow of a first viscous material of a first color;
b) a second extruder for providing a flow of a second viscous material of a second color different from the first color;
c) a feed block for combining the flow of the first viscous material and the flow of the second viscous material to form a stream of combined viscous material, the stream comprising a first band of the first color and a second band of the second color, the second band being adjacent to the first band;
d) a dynamic mixer for applying a dividing, overturning and combining motion to said stream of combined viscous material to partially mix the first viscous material and the second viscous material, such that such that upon exiting the dynamic mixer, the first material of the first color and the second material of the second color form a color pattern in the stream of combined viscous material, wherein said dynamic mixer has elements configured for acquiring a specific radial orientation in a range of radial orientations;
e) an electronic controller in communication with said dynamic mixer, said electronic controller being configured for varying the specific radial orientation of the elements of the dynamic mixer during the applying of the dividing, overturning and combining motion to the stream of combined viscous material to cause variations in the color pattern in the stream of combined viscous material.

In some specific practical implementations, the system may further comprise a die for receiving the stream of combined viscous material from the dynamic mixer, the die being configured for forming the stream of combined viscous material into a sheet or into a tube.

In some specific practical implementations, the system may further comprise at least one additional extruder for providing at least one additional flow of a third viscous material and a combining device for combining the stream of combined viscous material released by the dynamic mixer with the at least one additional stream of the third viscous material provided by the at least one additional extruder. The combining device may be configured for forming a co-extruded stream having at least two layers using the stream of the third viscous material and the stream of combined viscous material.

In accordance with another aspect, a process for manufacturing a plastic article comprising color effects is presented. The process comprises molding two or more of the manufactured sheets of extruded material using thermoforming to shape the two of more manufactured sheets into a kayak shape, at least one of the two or more of the manufactured sheets having color effects created using a process of the type described above.

In specific practical implementations, another one of the two or more of the manufactured sheets may have a uniform color or, alternatively, may also have color effects created using a process of the type described above.

In specific practical implementations, the process may be suitable for use during manufacturing of many different types of products including, but without being limited to, kayaks, sleds and stand-up paddle boards amongst many others.

In accordance with another aspect, a plastic article is provided comprising an extruded sheet made of a plurality of materials of different colors. The sheet is formed into at least a portion of the plastic article and has a surface presenting color effects including color gradation effects resulting from combinations of the viscous materials, wherein sections of the extruded sheet taken along a longitudinal axis extending along the extruded sheet are characterized by undulating color bands oriented along a longitudinal extent of the sheet.

In specific practical implantations, the plastic article may be a stand-up paddle board or a kayak.

In accordance with another aspect, a sheet of extruded material made of a plurality of viscous materials of different colors is provided. The sheet has a surface presenting color effects including color gradation effects resulting from combinations of the viscous materials such that sections of the extruded sheet taken along a longitudinal axis extending along the extruded sheet are characterized by undulating color bands oriented along a longitudinal extent of the sheet, which may in some cases create a wave-like pattern.

In accordance with another aspect, a kayak is provided comprising an extruded sheet made of a plurality of viscous materials of different colors, the sheet being formed into at least a portion of the kayak and having a surface presenting color effects including color gradation effects resulting from combinations of the viscous materials, wherein sections of the extruded sheet are characterized by color bands diagonally oriented with reference to a longitudinal extent of the extruded sheet.

In accordance with another aspect, a sheet of extruded material made of a plurality of viscous materials of different colors, the sheet having a surface presenting color effects including color gradation effects resulting from combinations of the viscous materials, wherein sections of the extruded sheet are characterized by color bands diagonally oriented with reference to a longitudinal extent of the extruded sheet.

All features of embodiments which are described in this disclosure and are not mutually exclusive can be combined with one another. Elements of one embodiment can be utilized in the other embodiments without further mention.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

A detailed description of specific embodiments of the present invention is provided herein below with reference to the accompanying drawings in which.

Figure 1:
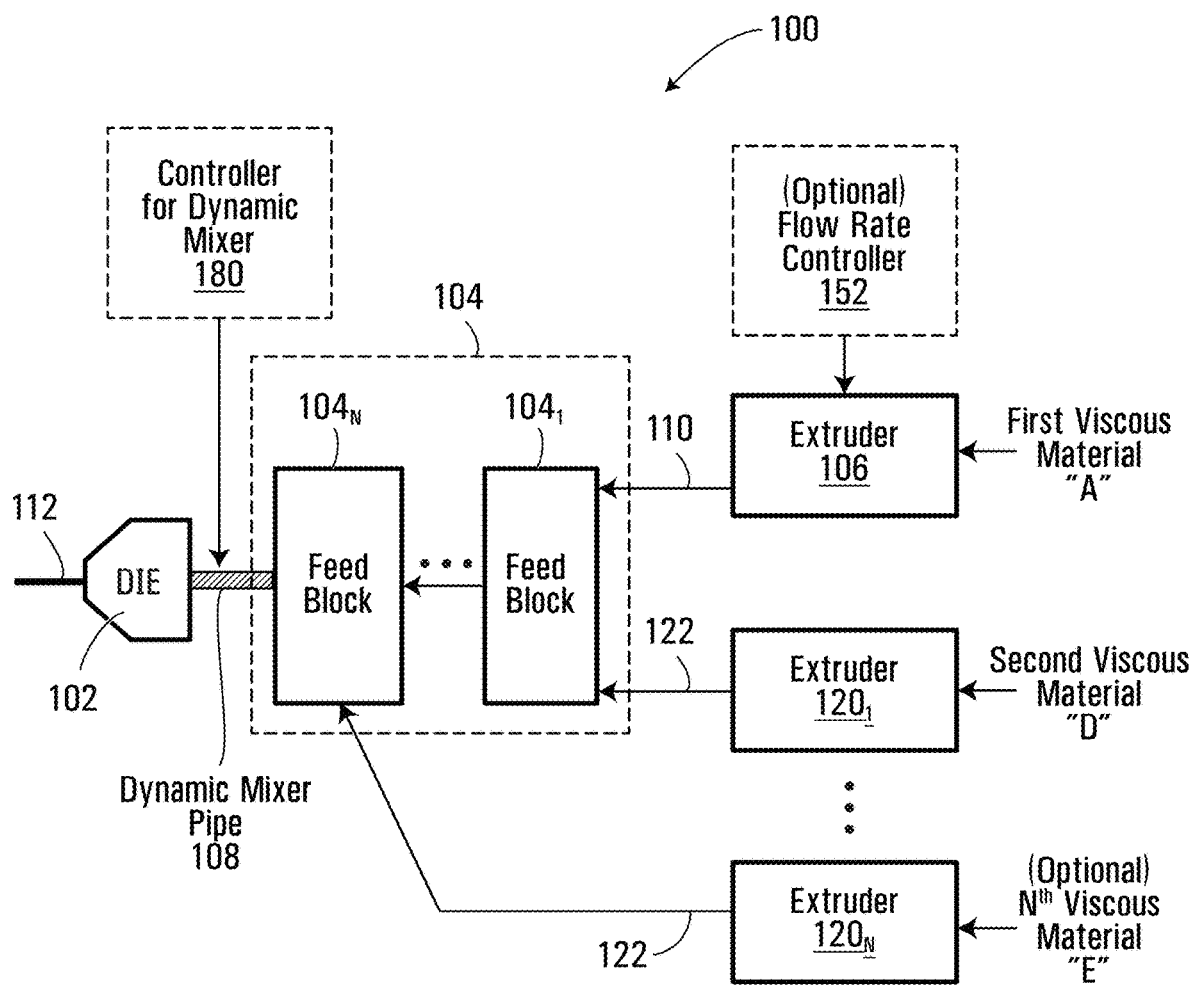
FIG. 1 illustrates a system for manufacturing plastic sheets, according to a non-limiting example of implementation of the present invention.

In the drawings, embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The present invention is directed to a process and apparatus for creating color effects using extrudable material, such as plastic or metal.

In the following examples of implementation, the present invention will be described for use in creating color effects in extruded plastic material. However, it is to be appreciated that the invention is not limited to any particular type of material. Rather, the concepts described in the present document may be applied to different types and grades of extrudable material.

FIG. 1 depicts a system 100 for manufacturing plastic sheets, according to a non-limiting example of implementation of the present invention. The system 100 shown is formed of several components, including a die 102, a feed block 104, a first (primary) extruder 106 for providing a first material ("A") and one or more secondary extruders $120_1, \ldots, 120_N$, where the number N of secondary extruders $120_1, \ldots, 120_N$ in the system 100 is at least one.

Note that, in alternative embodiments, the system 100 may include two or more secondary extruders $120_1, \ldots, 120_N$.

Extruder 106 and each extruder $120_1, \ldots, 120_N$ is operative to mix and heat plastic granules. The granules are heated to a predetermined temperature, sufficient to cause melting of the granules for producing a homogeneous, viscous plastic mixture.

Examples of the different types of thermoplastics that can be extruded include: LDPE, HDPE, ABS, polystyrene, polypropylene, acetates, butyrates, nylons, polyphenylene sulfides, acetals, polycarbonates and thermoplastic rubbers and polyesters, among other possibilities.

Typically, a controlled amount of colorant is added to the mixture in extruder 106 and in each extruder $120_1, \ldots, 120_N$, for obtaining viscous plastic mixtures of respective specific colors.

Different techniques, known in the art, may be used to color the plastic mixtures in the extruders 106 and $120_1, \ldots, 120_N$. In one example, colorant in the form of granules is added to and mixed with the plastic granules before they are fed into the extruders 106 and $120_1, \ldots, 120_N$ for melting. In another example, colorant in liquid form may be fed into the extruders for mixing with the plastic granules. Alternatively, the non-recycled plastic granules themselves can be pre-colored such that it is not necessary to add colorant to the mixture. In another alternative, recycled plastic granules of a specific color may be used in the extruders 106 $120_1, \ldots, 120_N$, such that the addition of a colorant is not required.

In a specific practical implementation, the mixture "A" used in the primary extruder 106 may be a translucent material and the mixture "D" in the secondary extruders $120_1$ may be a mixture of a specific color. Similarly, the mixture "E" in another secondary extruder $120_N$ may be a mixture of a specific color, which may be the same or distinct from the color of mixture "D" used in the secondary extruder $120_1$.

The primary extruder 106 is configured to melt and mix the plastic granules such that the mixture 110, which is released from extruder 106, is perfectly melted and homogeneous, both in temperature and in color, upon its exit from the extruder 106.

Similarly, a secondary extruder 120 is configured to melt and mix the plastic granules such that the mixture 122, which is released from a secondary extruder 120, is also perfectly melted and homogeneous, both in temperature and in color, upon exit from the extruder 120.

Note that, with regard to the plastic mixture released by the primary extruder 106, the term "melted" implies that the mixture is characterized by a viscous or semi-fluid flow. The plastic mixture 110 released is also referred to herein as a flow of a first viscous material 110. The extruder 106 releases the flow of the first viscous material at a first rate of flow. The first rate of flow may be any suitable rate flow depending on the type of extrudable material that is being created by the system 100, for example 400 kg/hr, 300 kg/hr, 100 kg/hr or 50 kg/hr, among many other possibilities. As will be described in greater detail later on in the present document, the flow of the first viscous material 110 may optionally be provided at a first rate of flow that can be caused to vary over time.

With regard to the plastic mixture output by the secondary extruders $120_1, \ldots, 120_N$, the term "melted" also implies that the mixture is characterized by a viscous or semi-fluid flow. The plastic mixture 122 output by each extruder 120 is also referred to herein as a flow of a (second) viscous material 122. Each one of the secondary extruders 120 may be set to a respective rate of flow, for example 400 kg/hr, 300 kg/hr, 100 kg/hr, 50 kg/hr, 25 kg/hr or 10 kg/hr among many other possibilities. In the embodiment shown in FIG. 1, during the creation of an extruded material, the secondary extruders $120_1, \ldots, 120_N$ may be set to operate such as to release the plastic mixtures 122 at respective rates of flow that are kept substantially constant over time. It is however to be appreciated that, in alternate embodiments, the rates of flow of material released by any of the secondary extruders $120_1, \ldots, 120_N$ may optionally be caused to vary over a time period so that flows of both the viscous material released by the primary extruder 106 and one or more of the secondary extruders $120_1, \ldots, 120_N$ are caused to vary over time. It is also to be appreciated that, in such alternative embodiments, the time intervals over which the viscous material released by the primary extruder 106 and the viscous material released by or more of the secondary extruders $120_1, \ldots, 120_N$ are caused to vary need not be the same.

The structure and functionality of extruders are well known to those skilled in the art, and will not be described in further detail.

In the specific embodiment depicted in FIG. 1, the primary extruder 106 is in communication with an optional flow rate controller 152 configured for varying over time the rate of flow of the viscous material 110 released by the primary extruder 106.

Figure 2:
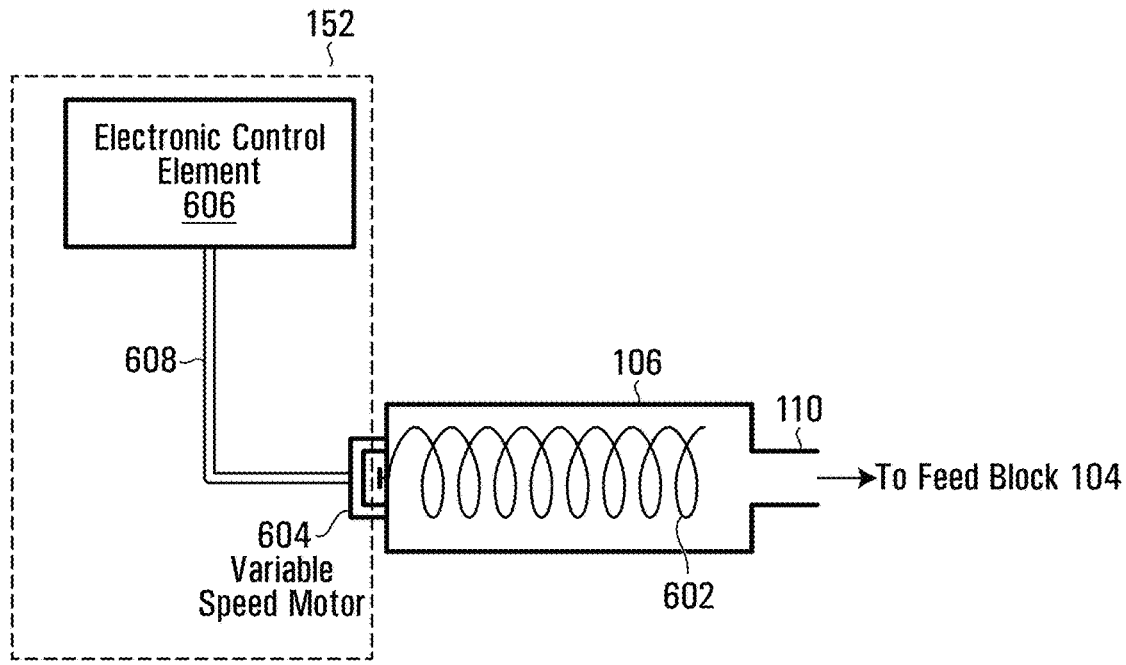
FIG. 2 depicts components of a flow rate controller that may be used in connection with an extruder of the system of FIG. 1.

As depicted in FIG. 2, the flow rate controller 152 associated with the primary extruder 106 may include an electronic control element 606 configured for causing the first rate of flow of the viscous material 110 to vary over time. More specifically, and as shown in the specific embodiment depicted, the flow rate controller 152 may include a variable speed motor 604 configured for operating at different speeds an extruder screw 602 in the extruder 106. In this embodiment, the electronic control element 606 includes a processor (not shown) programmed for releasing control signals for controlling the speed of operation of the variable speed motor 604, which in turn causes a variation in a speed of rotation of the extruder screw 602 in the primary extruder 106. Any suitable manner for controlling the speed of operation of the variable speed motor 604 may be used and such manners are known in the art and will not be described further here.

In a specific practical implementation, the flow rate controller 152 may be configured for varying the first rate of flow over time at least in part by causing the first rate of flow to oscillate between a lower flow rate threshold and an upper flow rate threshold over a certain time interval.

In specific practical implementation, the lower flow rate threshold, the upper flow rate threshold and/or the time period may be preset, for example by a programmed element stored in the flow rate controller 152. Optionally, the lower flow rate threshold and/or the upper flow rate threshold and/or the time period may be set (or modified) by an operator of the system 100 in order to control at least in part visual characteristics of the color pattern in the stream of combined viscous material that will be generated by the system 100. For example by shortening the time period, more compact visual wave-like effects may be caused in the resulting output stream of combined viscous material while extending the time period may allow smoother/software visual wave-like effects to be created. The time period may be set to any suitable duration in dependence on the desired visual effect to be created in the extruded material. In non-limiting practical implementations, the time interval used tends to range between about 20 seconds and about 1 minute. If we look now to the flow rate thresholds, increasing the upper flow rate threshold would tend to cause an increased volume of the first viscous material ("A") to be pushed towards the feed block 104, which in turn causes a greater amount of this substance to find itself in the resulting output stream of combined viscous material. Analogously, decreasing the lower flow rate threshold would tend to cause a reduced volume of the first viscous material ("A") to be pushed towards the feed block 104, which in turn causes a lesser amount of this substance to find itself in the resulting output stream of combined viscous material. Other variations can be made in the same manner to achieve different color patterns.

Figure 4A:
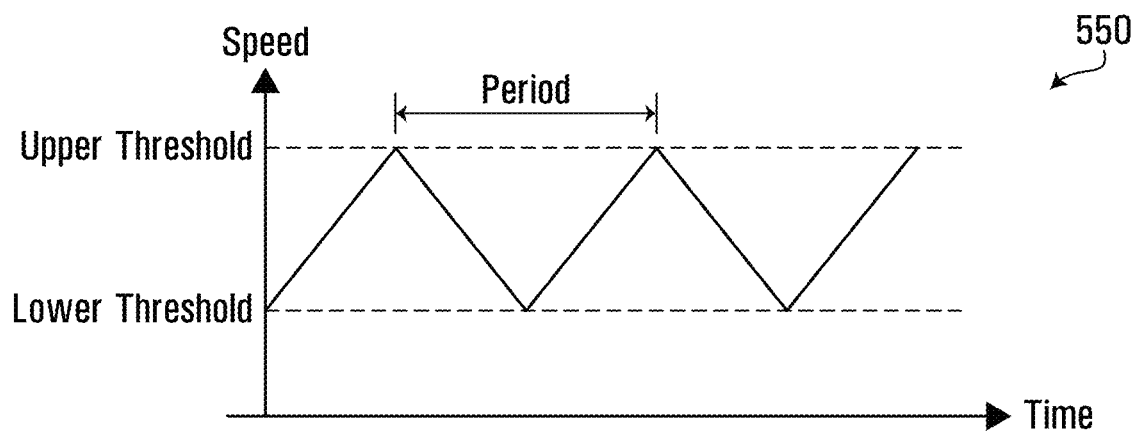
FIGS. 4A and 4B are charts illustrating variations in a speed of operation of an extruder screw in order to cause variation in a flow rate in connection with an extruder of the system of FIG. 1.
Figure 4B:
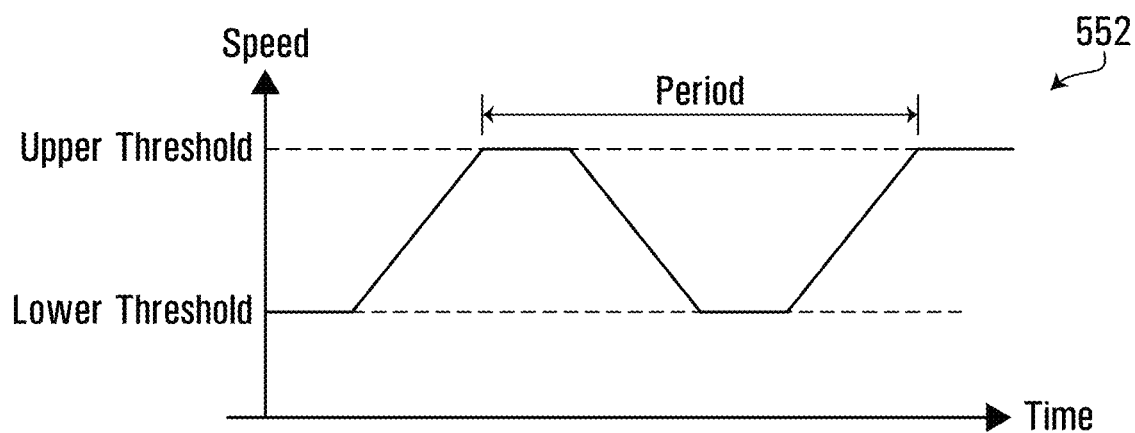

In the embodiment depicted in FIG. 2, the control of the first flow rate may be achieved by operating the variable speed motor 604 such as to cause the extruder screw 602 to vary its speed of rotation between an upper threshold and a lower threshold over a time period. FIGS. 4A and 4B show charts illustrating variations of the speed of operation of the extruder screw 602 over time in connection with extruder 106. It is to be appreciated that the examples shown in FIGS. 4A and 4B have been set forth for the purpose of illustration only and that many other suitable manners of varying over time the rate of flow of the viscous material 110 released by the primary extruder 106 may be contemplated and will become apparent to the person skilled in the art in view of the present description.

Figure 3:
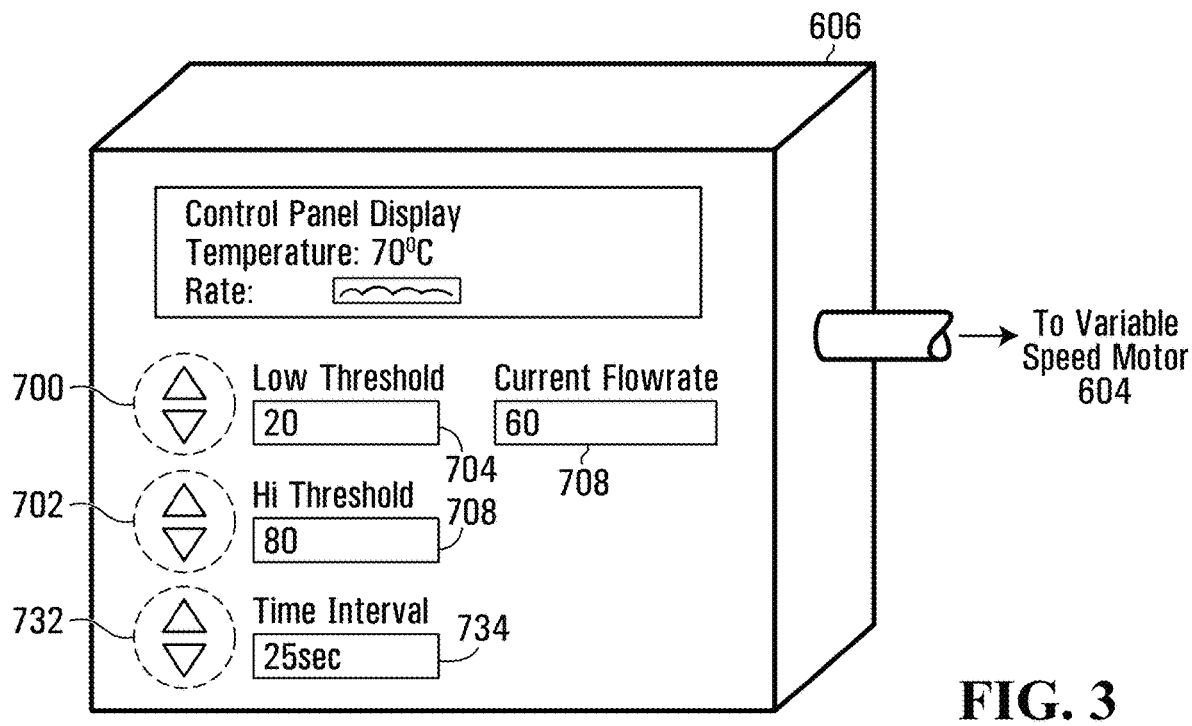
FIG. 3 depicts an electronic control element of the flow rate controller of FIG. 2 in accordance with a non-limiting embodiment of the present invention.

Optionally in some embodiments, such as the specific one depicted in FIG. 3, the electronic control element 606 of the flow rate controller 152 may provide one or more user operable controls 700 702 732 for allowing a user to set the lower flow rate threshold and/or the upper flow rate threshold and/or the time interval in order to control at least in part visual characteristics of the color pattern in the stream of combined viscous material exiting the system. The user operable controls 700 702 732 may include mechanically actuated switches that allow a user to providing control commands to increase or decrease a corresponding flow control parameter (for e.g. the lower flow rate threshold, the upper flow rate threshold or the time period). Optionally, display areas 704 708 734 may be provided showing values of the flow control parameters. It is to be appreciate that, although the electronic control element 606 shown in FIG. 3 has been shown as including a dedicated control interface incorporating user operable controls, in alternative embodiment such control interface may be provided on the display screen of a general purpose computing device in communication with the electronic control element 606 and programmed to display a control interface including user operable controls of the type described above.

It is to be appreciated that in alternative implementation, the primary extruder 106 may be configured to release the flow of the flow of a first viscous material 110 at a substantially constant flow rate. In such implementations, the flow rate controller 152 may be omitted.

In the context of the present invention, the extruder 106 and one or more of extruders 120$_1$, . . . , 120$_N$ produce plastic mixtures 110 122 of different colors and, optionally different viscosities. In a specific, non-limiting example, the system 100 may include an extruder 106 and one secondary extruder 120$_1$ which producing plastic mixtures 110 122. In another example, the system 100 may include one primary extruder 106 and two secondary extruders 120$_1$ 120$_2$ each of which is producing a plastic mixture of a different color and, optionally different viscosity.

In a practical embodiment, the plastic mixture 110 released by the (primary) extruder 106 is characterized by a first viscosity and the plastic mixture 122 released by the (secondary) extruder 120 has a second viscosity. The first viscosity and the second viscosity may be essentially the same or may be distinct from one another. The first viscosity may be lower (or higher) than the second viscosity. In embodiments in which there may be multiple (secondary) extruders 120, the plastic mixtures released by each (secondary) extruder may have the same (or similar) viscosity or, alternatively, may each have a distinct viscosity.

The use of materials having different viscosities may reduce an amount of color blending between the first color and the second color when the materials are combined in the feedblock 104 and dynamic mixer 108 as will be described later on in the present document. The respective viscosities of the materials released by the (primary) extruder 106 and the (secondary) extruder(s) 120 may also be expressed in terms of high load melt index (HLMI). In this regard, the first viscous material may be associated with a first high load melt index (first HLMI) and the second viscous material may be associated with a second high load melt index (second HLMI). The first HLMI may be greater (or less) than the second HLMI.

It has been observed that using materials with differing HLMIs reduces the amount of blending between the materials. The greater the difference in high load melt index, the lesser the amount of blending appears to occur. The first HLMI may be at least about ten times (10×); at least about twenty times (20×); or at least about one hundred times (100×) the second HLMI. It is to be appreciated that, in practical implementations, the use of material having different viscosities may achieve different color effects compared to the use of materials of uniform viscosities and that such materials may be use alone or in combination with the variation in flow rate of the flow released by the primary extruder 106.

The plastic mixture 110 released by the (primary) extruder 106 and the one or more plastic mixtures 122 released by the one or more (secondary) extruders 120$_1$, . . . , 120$_N$ are then provided to the feed block 104.

The feed block 104 is configured for combining the flows 110 122 of viscous plastic output by the different extruders 106 120$_1$, . . . , 120$_N$ into a single patterned stream of combined viscous plastic, as will be discussed further below.

In the example depicted, the feed block 104 is comprised of multiple sequence feed blocks 104$_1$ . . . 104$_N$ where each feed block injects an additional stream of viscous material released by a respective secondary extruder 120$_1$, . . . , 120$_N$ into the stream of viscous material released by first (primary) extruder 106 or released by a previous feed block in the sequence. It will however be appreciated that other configurations for feed block 104 are possible in alternative implementations. For example, feed block 104 may be comprised of a single modules having N+1 input streams, where N corresponds for the number of secondary extruders 120$_1$, . . . , 120$_N$ in the system.

Figure 6:
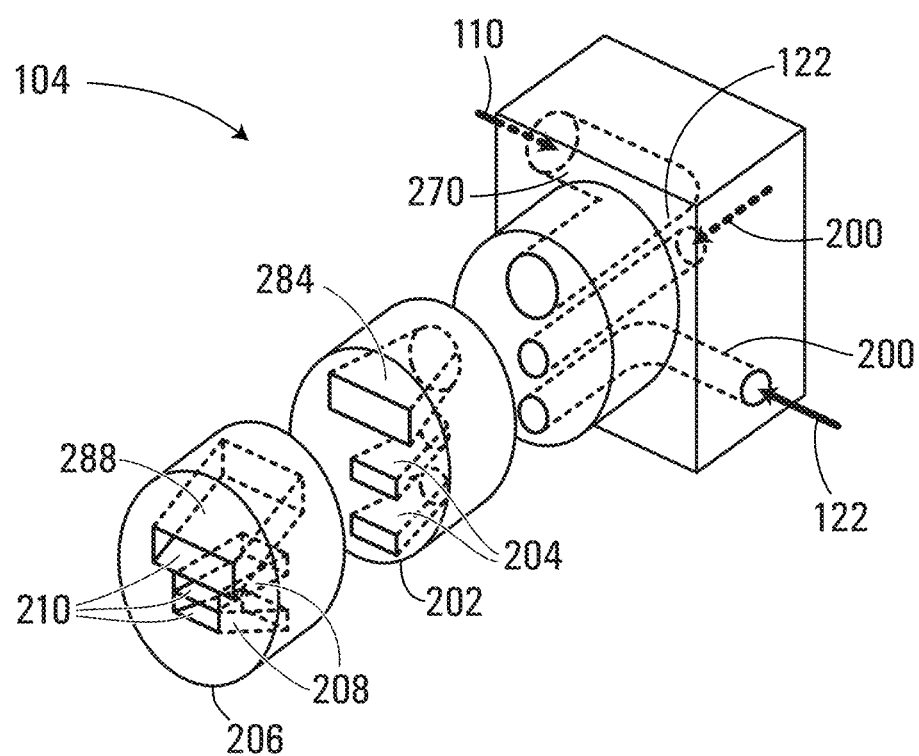
FIG. 6 depicts an example of a possible structural configuration for a feed block shown in FIG. 1.

FIG. 6 illustrates a non-limiting example of a possible configuration for the feed block 104, for the case in which the system 100 is formed of one primary extruder 106 and two secondary extruders 120$_1$ and 120$_N$, wherein the primary extruder 106 releases a flow 110 of viscous material of a greater size than the flows 122 released by each of the secondary extruders 120$_1$ and 120$_N$. Thus, the feed block 104 receives three distinct flows 110 122 of viscous plastic, each of which is input to the feed block 104 from the associated extruder 106 and 120$_1$ and 120$_N$ via a respective feed port 270 200.

The feed block 104 also includes a programming section 202, which receives the flows 110 and 122 from the feed ports 270 200 into corresponding channels 284 204. This programming section 202 is operative to shape and position the flows 110 and 122 according to a predetermined pattern, whereby the flows undergo a programming of sorts within the channels 284 204 in order to produce a desired pattern for the stream of combined viscous material. In the example shown in FIG. 6, the channels 284 204 of the programming section 202 are designed to produce a pattern of layers where the layer associated with the flow 110 is shown as having a greater volume/size that the layers associated with the flows 122 to accommodate the higher flow rate of the first viscous material in the present example. It is to be appreciated that different sizes, shapes and layouts for the channels 284 204 of the programming section 202 may also be used, in order to produce different patterns for the stream of combined viscous material.

Note that the programming section 202 of the feed block 104 may be designed to divide a particular flow 110 or 122 into two or more sub-flows, for producing a different pattern for the stream of combined viscous material. In a specific example, assume the feed block 104 receives two flows 110 and 122, one that flow 110 is translucent in color and that flow 122 is red in color. The programming section 202 may divide the red flow 122 into two red sub-flows, and orient these sub-flows such that the translucent flow 110 is sandwiched between the two red sub-flows, according to a particular layout and pattern.

Finally, the feed block 104 includes a transition section 206, operative to fuse together the separate flows 110 and 122, for generating the patterned stream of combined viscous material. As seen in FIG. 6, the channels 288 208 of the transition section 206 are oriented such that their output ports 210 are located immediately adjacent one another. As the distinct flows 110 and 122 exit the respective output ports 210, the flows of the viscous plastics, fuse together into a single, combined stream of viscous plastic.

In the context of the present invention, the stream of combined viscous material generated by the feed block 104 is characterized by zones of material having different colors and, optionally, different viscosities. More specifically, at least one zone of material may be formed of a first viscous plastic material of a first color and first viscosity (material "A") and another zone may be formed of a second viscous plastic of a second color and second viscosity (material "D").

As mentioned above, the stream of combined viscous material released by the feed block 104 may take on different patterns. Rather than a horizontal layer pattern, the feed block 104 may combine the different flows 110 122 according to a vertical layer pattern, a ring pattern, a tube pattern or a pie chart pattern, among many other possibilities. In the case of the ring pattern, each separate flow 110 122 of viscous plastic may be formed into a concentric ring, where the rings of different colors and sizes are fused together to form a tube of combined viscous plastic characterized by adjacent zones of different colors and, optionally, different viscosities. In the case of the tube pattern, the separate flows 110 122 may be positioned with respect to one another such that, when fused together, they form an elongate tube, characterized by adjacent zones of different colors and, optionally, different viscosities.

FIGS. 11A, 11B, 11C, 11D and 11E show examples of cross-sections of combined streams of viscous material that may be generated using different practical embodiments of the feed block 104.

Figure 11A:
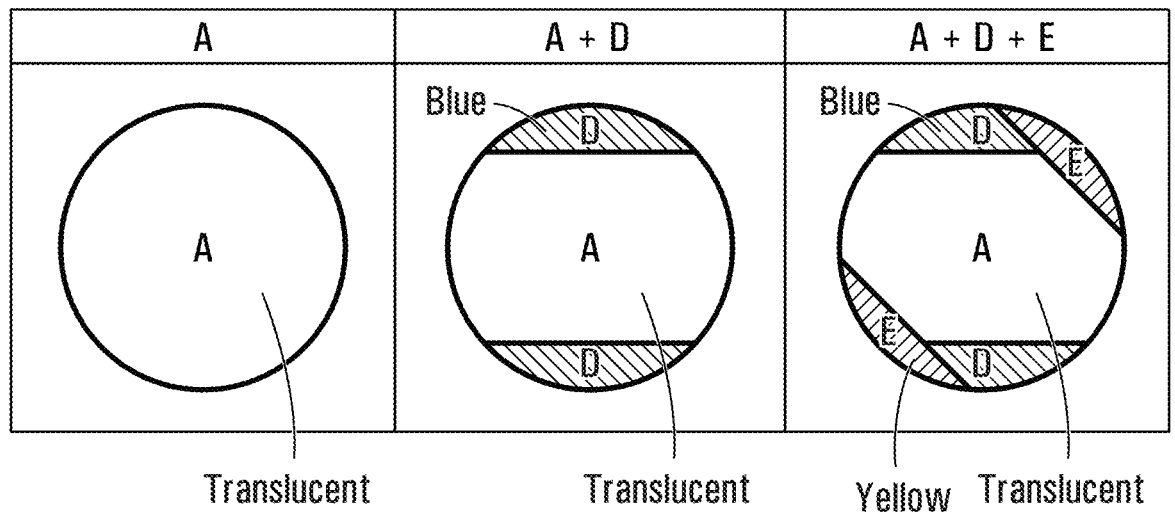
FIG. 11A shows examples cross-sectional views of combined streams of viscous material entering the dynamic mixer 108 of the system 100 shown in FIG. 1 in accordance with non-limiting examples of implementation, the examples including (a) a first viscous material ("A") only; (b) first viscous material ("A") and second viscous material ("D"); and (c) first viscous material ("A"), second viscous material ("D") and third viscous material ("E")
Figure 11B:
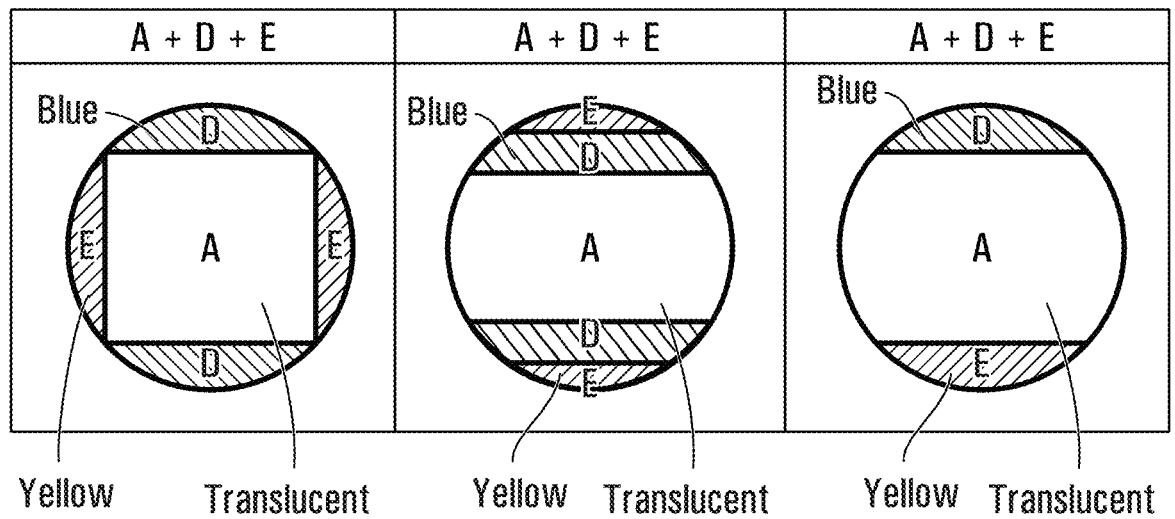
FIGS. 11B, 11C, 11D and 11E shows other examples of cross-sectional views of combined streams of viscous material entering the dynamic mixer 108 of the system 100 shown in FIG. 1 in accordance with non-limiting examples of implementation.
Figure 11C:
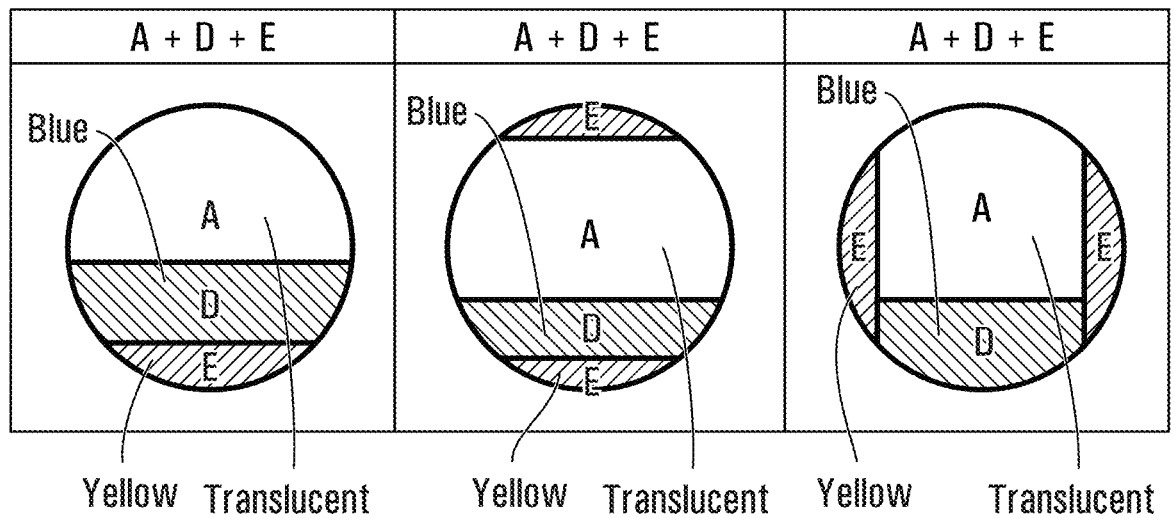
Figure 11D:
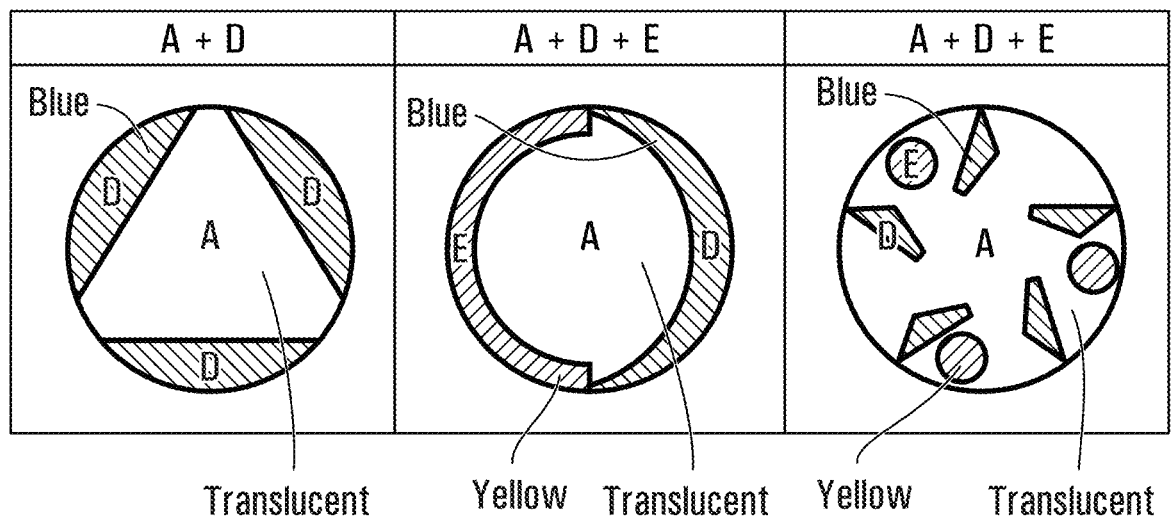
Figure 11E:
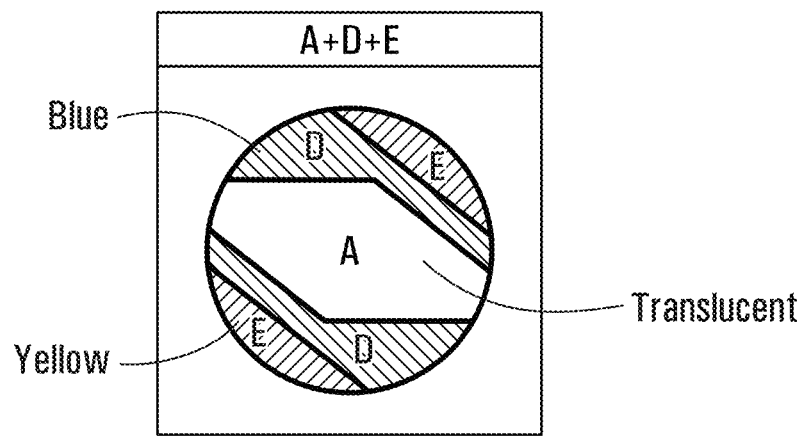

For example, FIG. 11A shows examples of cross-sections including (a) a first viscous material ("A") only; (b) first viscous material ("A") and second viscous material ("D"); and (c) first viscous material ("A"), second viscous material ("D") and third viscous material ("E"). It is to be understood that there is a myriad of other possible configurations and that the examples here have been shown for the purpose of illustration only.

Note that a generally uniform transition of the flows 110 122 from the extruders 106 120 to the feed ports 270 200 of the feed block 104, as well as from one component to another within the feed block 104, without any brusque variations in the channel dimensions may assist in reducing the likelihood of stagnation of the viscous plastic material within the feed block 104.

The use of feed blocks in extrusion processes is well known in the art and, as such, additional details pertaining to the feed block structure and functionality will not be described in further detail herein.

Specific to the present invention, the stream of combined viscous material released by the feed block 104 is fed through a dynamic mixer pipe 108. The dynamic mixer 108 is operative to act on the stream of combined viscous material for partially mixing the adjacent zones of different colors (and optionally different viscosities) in order to create color effects in the stream of combined viscous material.

Figure 7:
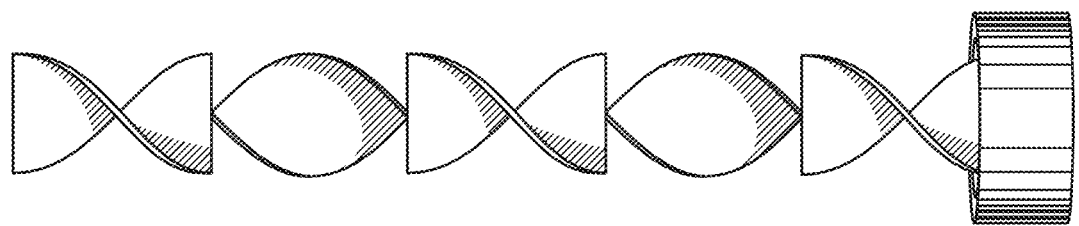
FIG. 7 is a perspective view of a helical dynamic mixer.

Dynamic mixers are known in the industry to be useful for effectively mixing fluids, by executing the operations of division of flow, radial mixing and flow reversal. The most common type of mixer is the helical mixer, as seen in the example of FIG. 7, which includes a series of elements positioned adjacent another. Each element may be formed of a rectangular plate twisted by 180 degrees, which splits the oncoming flow in half and then turns it through 180 degrees. Each element in the series may be rotated 90 degrees with respect to the preceding element, so as to constantly subdivide the flow. When two fluids of different colors enter a helical mixer pipe, the dividing and overturning motion applied to the fluids by the elements of the mixer results in a gradual blending of the two fluids. More specifically, as the fluids go along the curves of each element, they are rotated radially towards the pipe wall, or rotated back to the center. Furthermore, as the fluids pass from one element to the next, the fluids are bisected and they change direction to the right or to the left, the force of inertia that suddenly occurs creating a strong flow reversal motion that results in stirring and mixing of the fluids. It is to be appreciated that while a helical mixer has been shown in certain figures and described in the present description, any suitable type of mixer may be used in alternate implementations.

The color pattern in the stream released by the dynamic mixer 108 is configured at least in part based on a radial orientation of the elements of the dynamic mixer 108. The color pattern in the stream may be altered by positioning the elements of the dynamic mixer 108 in alternative radial orientations by rotating the elements about a pivot axis extending through the dynamic mixer 108 in a longitudinal direction. The alternative radial orientations may be established based on an internal structure of the dynamic mixer 108 such that upon exiting the static mixer a desired effect may be achieved in the stream of viscous material. In specific practical implementations, the alternative radial orientations may be a rotation of about 45°, 90°, 135° or 180° measured from a reference radial orientation however other alternative radial orientations may also be suitable for other dynamic mixers.

In some implementations, a specific radial orientation of the elements of the dynamic mixer 108 may be set prior to initiating a process using the system 100 (shown in FIG. 1).

In some alternative implementations, the specific radial orientation of the elements of the dynamic mixer 108 may be dynamically modified over a time period during operation of the system 100 (shown in FIG. 1) to cause variations in the color pattern in the stream of combined viscous material released by the dynamic mixer 108. More specifically, the color pattern in the stream may be dynamically altered over time by varying the specific radial orientation of the elements of the dynamic mixer 108 during the application of the dividing, overturning and combining motion to the stream of combined viscous material entering the dynamic mixer 108. The varying of the specific radial orientation of the elements of the dynamic mixer 108 may be effected by performing a rotation of the elements of the dynamic mixer 108 about the pivot axis by a by a pre-determined amount.

In the specific embodiment depicted in FIG. 1, the dynamic mixer 108 is in communication with a dynamic mixer controller 180 configured for varying over time the specific radial orientation of the elements of the dynamic mixer 108.

Figure 9:
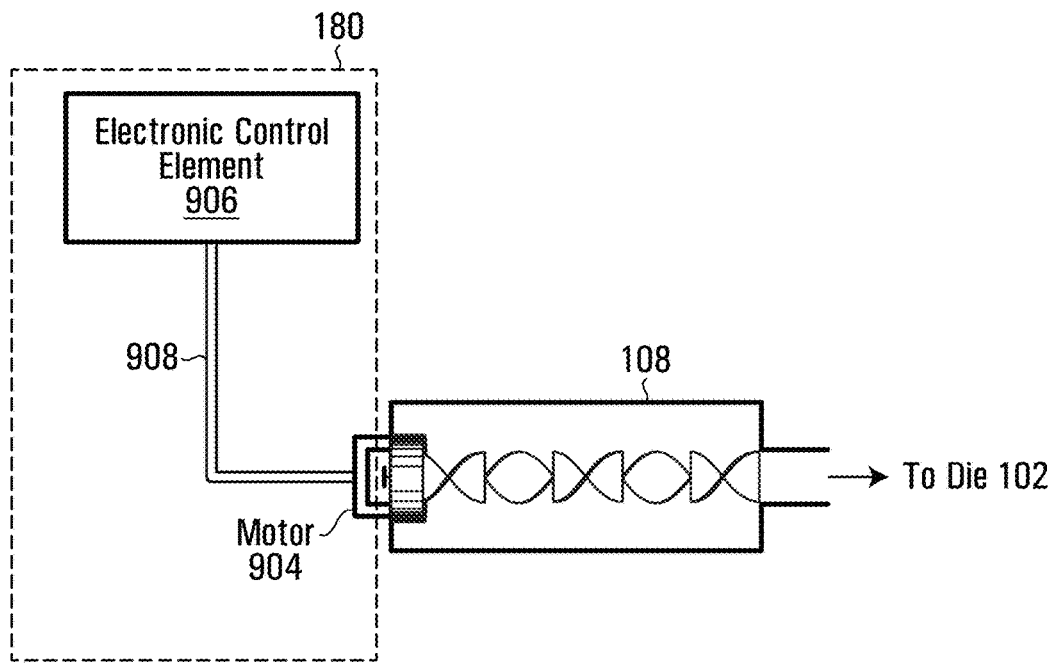
FIG. 9 depicts components of a controller configured to control a dynamic mixer in connection with the system of Figure in accordance with a non-limiting embodiment of the present invention.

As depicted in FIG. 9, the dynamic mixer controller 180 associated with the dynamic mixer 108 may include an electronic control element 906 configured for causing the specific radial orientation of the elements of the dynamic mixer 108 to vary over time. More specifically, and as shown in the specific embodiment depicted, the dynamic mixer controller 180 may include a motor 904 configured for rotating the elements of the dynamic mixer 108 about a pivot axis extending through the dynamic mixer 108 in a longitudinal direction. The dynamic mixer controller 180 may be configured to cause the motor 904 to rotate the elements of the dynamic mixer 108 in a clock-wise and/or counter clock-wise direction. The motor 904 may be a variable speed motor such as to allow the dynamic mixer controller 180 to modify the speed at which the elements of the dynamic mixer 108 are being rotated. In this embodiment, the electronic control element 906 includes a processor (not shown) programmed for releasing control signals for controlling the speed and direction of operation of the motor 904, which in turn causes a variation in an rotation amount, rotation direction and/or a speed of rotation of the elements of the dynamic mixer 108. Any suitable manner for controlling the speed of operation of the variable motor 904 may be used and such manners are known in the art and will not be described further here.

In some specific practical implementations, the dynamic mixer controller 180 may be configured for performing rotations of the elements of the dynamic mixer 108 by a pre-determined rotation amount repeatedly over time, at regular or non-regular time intervals, during the applying of the dividing, overturning and combining motion to the stream of combined viscous material. The pre-determined rotation amount may be a rotation by any suitable angle such as, for example, it may be a rotation by an angle of rotation greater than 0° and less than or equal to 360°; between 30° and 130°; between 45° and 110°. In a non-limiting example, the angle of rotation is about 90°. It is also to be appreciated that the pre-determined rotation amount may vary over time. For example, the elements of the dynamic mixer 108 may be rotated in a clock-wise direction by a first angle in a first instance (say 30°) and then may be rotated in a clock-wise direction by a second angle in a second instance (say 45°) and then may be rotated in a counter-clock-wise direction by a third angle in a third instance (say 15°).

In some specific practical implementations, the dynamic mixer controller 180 may be configured for varying the rotational position of the dynamic mixer 108 to cause the rotational position of the elements to vary substantially continuously over a time interval, for example by operating the motor 904 at a substantially uniform/constant speed for the time interval.

In some specific practical implementations, the dynamic mixer controller 180 may be configured for causing the rotational position of the elements to vary between a first rotational position threshold and a second rotational position threshold over a time interval. In specific practical implementations, the first rotational position threshold may be a rotational position of about 0°, 90°, 180°, 270° or 360° or any other position, relative to reference position. The first rotational position threshold may be a rotational position of about of about 0°, 90°, 180°, 270° or 360° or any other position, relative to a reference a rotational position. In addition, the rotational position of the elements may be caused to vary between the first rotational position threshold and the second rotational position threshold over the time interval repeatedly during the applying of the dividing, overturning and combining motion to the stream of combined viscous material. It is to be appreciated that while in the example presented the rotational thresholds mentioned were described as being spaced in equal increments of 90°, this was done for the purpose of example only and that any other rotational positions may be used and that these need not be spaced by increments of 90° and need not be equally spaced.

In some specific practical implementations, the first rotational position threshold, the second rotational position threshold and/or the time interval may be preset, for example by a programmed element stored in the dynamic mixer controller 180. Optionally, the first rotational position threshold and/or the second rotational position threshold and/or the time interval may be set (or modified) by an operator of the system 100 in order to control at least in part visual characteristics of the color pattern in the stream of combined viscous material that will be generated by the system 100.

For example by shortening the time interval, more compact (higher frequency) for the visual undulating color bands may be caused in the resulting output stream of combined viscous material while extending the time interval may allow smoother/softer (lower frequency) for the visual undulating color bands to be created. The time interval may be set to any suitable duration in dependence on the desired visual effect to be eventually created in the extruded material. In non-limiting practical implementations, the time interval used tends to range between about 0.5 second and about 10 seconds however it will be appreciated that any suitable time interval may be used in practical implementations in dependence of a desired visual affect to be achieved. If we look now to the first and second rotational position thresholds, increasing the magnitude of the difference between the first and second rotational position thresholds generally translates into undulating color bands with wave-like effects with correspondingly greater amplitude in the resulting stream to be pushed towards the die 102. Analogously, decreasing magnitude of the difference between the first and second rotational position thresholds generally translates into undulating color bands with wave-like effects with correspondingly smaller amplitude in the resulting stream to be pushed towards the die 102. Other variations can be made in similar manners to achieve different color patterns.

The controller 180 may be configured to drive the elements of the dynamic mixer 108 at a rotational speed set to correspond to a pre-determined rotational speed. In specific practical implementations the pre-determined rotational speed may be at least 1°/second, at least 5°/second or at least 20°/second, while in other implementations it may be no more than 20°/second, no more than 5°/second or no more than 1°/second.

In some specific practical implementations, the dynamic mixer controller 180 may be configured for causing the rotation of the elements to be performed at a speed that varies over time between an upper rotational speed threshold and a lower rotational speed threshold over a time period. In some specific non-limiting embodiments, the controller of the static mixer 108 may be configured for causing the rotation of the elements to be performed at a speed that varies over time in accordance with a sinusoidal function. Increasing or decreasing a speed of rotation may typically have the effect of increasing/decreasing the frequency of visual pattern changes in the undulating color bands in the resulting output stream of combined viscous material.

Figure 10:
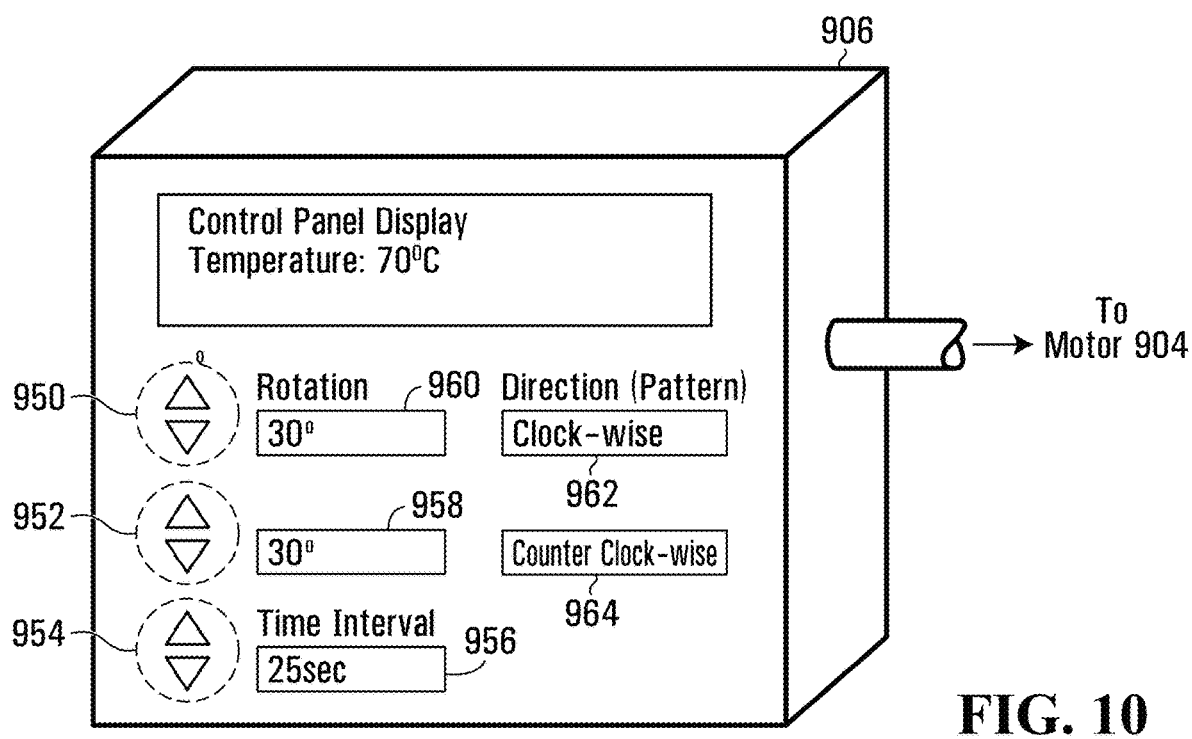
FIG. 10 depicts an electronic control element of the controller of FIG. 9 in accordance with a non-limiting embodiment of the present invention.

Optionally in some embodiments, such as the specific one depicted in FIG. 10, the electronic control element 906 of the flow rate controller 180 may provide a control interface having one or more user operable controls 950 952 954 962 964 for allowing a user to set the first rotational position threshold and/or the second rotational position threshold and/or the time interval and/or rotational direction pattern in order to control at least in part visual characteristics of the color pattern in the stream of combined viscous material exiting the system. The user operable controls 950 952 954 962 964 may include mechanically actuated switches and or data fields that allow a user to providing control commands to modify a corresponding parameter (for e.g. the first rotational position threshold, the second rotational position threshold, the time interval or the rotational direction pattern). It is to be appreciated that while the user control interface has been presented as including specific types of operable controls 950 952 954 962 964 for allowing a user to modify specific parameters of operation of the dynamic mixer 108, it is to be appreciated that alternative embodiments of the control interface may include fewer or additional operable controls so that different sets of parameters of operation can alternatively be specified by a user. For example, in some alternative implementations (not shown in the figures) the control interface may include one or more user operable controls for allowing a user to specify one or more rotational speeds for the dynamic mixer, optionally in combination with one or more time intervals and/or one or more angles or rotations and/or direction of rotation. Many other alternative will become apparent to the person skilled in the art in view of the present description and as such will not be described in further detail here.

Optionally, display areas 960 958 956 may be provided showing values of the control parameters. It is to be appreciate that, although the electronic control element 906 shown in FIG. 10 has been shown as including a dedicated control interface incorporating user operable controls, in alternative embodiment such control interface may be provided on the display screen of a general purpose computing device in communication with the electronic control element 906 and programmed to display a control interface including user operable controls of the type described above. In addition, or alternatively, the control interface may be incorporated in the same physical device of a control interface used in connection with the flow rate controller 152 (shown in FIG. 1).

Note that, for fluids of different types and/or viscosity, a different number of elements may be required in the dynamic mixer 108 in order to obtain a complete mixing of the two or more fluids from entry into the dynamic mixer 108 to output from the dynamic mixer.

Figure 8:
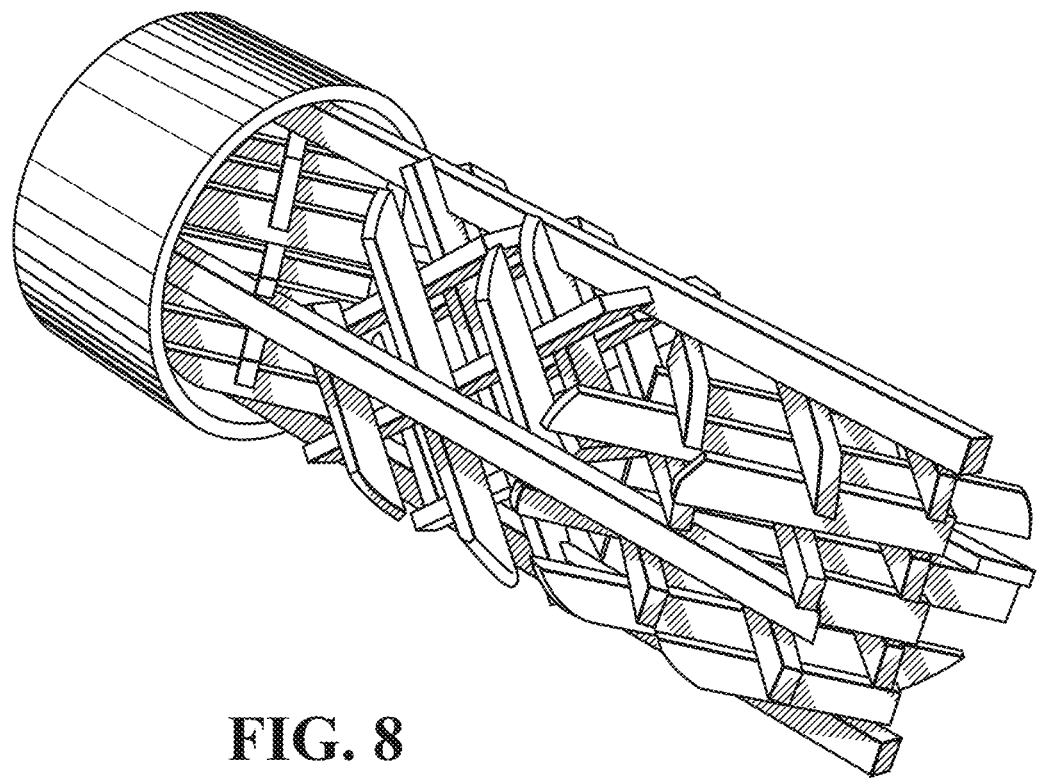
FIG. 8 is a perspective view of a different type of dynamic mixer.

Different types of dynamic mixers exist for uniformly mixing fluids in order to produce a homogenous mixture, such as the example shown in FIG. 8. Such dynamic mixers are typically all designed around the same principle, notably passing the viscous fluids through a series of elements that cause the fluids to undergo different flow patterns resulting in the mixing of the fluids.

Under the present invention, the dynamic mixer 108 may be characterized by a specific number of elements, such that, upon exit from the dynamic mixer 108, only a partial mixing of the different colored zones of the stream of combined viscous material has occurred, creating a blended, gradation in the colors of the stream of combined viscous material.

More specifically, upon entering the dynamic mixer pipe 108, the stream of combined viscous material includes adjacent zones of first and second colors (and optionally first and second viscosities) respectively. The dynamic mixer 108 is operative to mix together a portion of the zones such that, when the stream of combined viscous material exits the dynamic mixer 108, the stream of combined viscous material may be characterized by zones of a third color, different from the first and second colors. It should be understood that the zones of color that exit the dynamic mixer 108 are not necessarily clearly defined zones. In a first embodiment there can be a sharp transition between the color of one zone and the color of an adjacent zone, thereby creating clearly defined zones. However in an alternate embodiment, there can be a slow color gradation from the color of one zone to the color of an adjacent zone, such that the border between the two zones is not clearly defined. In addition, the shapes of the zones can vary. For example, the zones can be substantially straight, or can be wavy or curved. Likewise, the zones can be horizontally oriented, vertically oriented, or diagonally oriented at any angle between horizontally oriented and vertically oriented.

Typically, when the stream of combined viscous material exits the dynamic mixer 108, the third zone of a third color is a combination of the colors of the first and second zones. For example, if the stream of combined viscous material that enters the dynamic mixer 108 includes a first zone that is yellow and a second zone that is red, then typically, the stream of combined viscous material that exits the dynamic mixer may include a third zone that is a shade of orange.

Alternatively, when the stream of combined viscous material exits the dynamic mixer 108, the third zone of the third color is not necessarily located between the first and second zones of the first and second color. Instead, it is possible that the third zone of the third color is located between two zones of the first color, or two zones of the second color. For example, if the stream of combined viscous material that enters the dynamic mixer 108 includes a first zone that is white and a second zone that is blue, then the stream of combined viscous material that exits the dynamic mixer may have a third zone that is a lighter shade of blue. As such, it should be understood that for the purposes of the present invention, the third color can be a lighter shade of one of the first and second colors. In addition, it is possible that the stream of combined viscous material that exits the dynamic mixer 108 will not include a zone of white, and that instead the stream of combined viscous material includes a zone of the light blue located between two zones of the blue that entered the dynamic mixer.

Note that the dynamic mixer pipe 108 may include two or more dynamic mixers, for acting simultaneously on different portions of the stream of combined viscous material as the stream passes through the dynamic mixer pipe 108.

Figure 12:
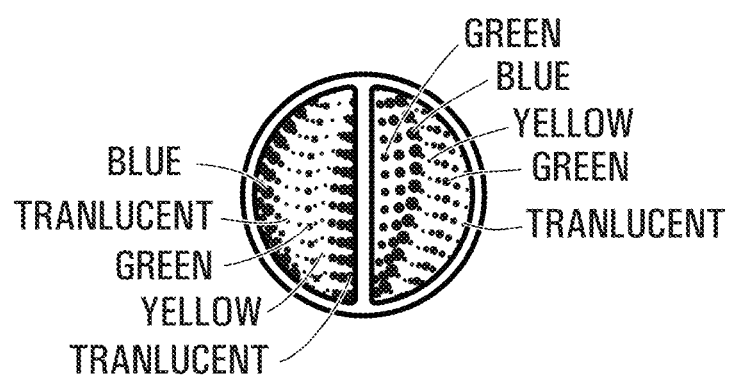
FIG. 12 illustrates a combined stream of viscous material as it exits the dynamic mixer in accordance with a non-limiting implementation.

Take for example the case where the system 100 includes a first extruder 106 producing a flow 110 of translucent viscous plastic, a second extruder 120₁ producing a flow 122 of blue viscous plastic and a third extruder 120₂ producing a flow 122 of yellow viscous plastic. Assume that the feed block 104 is operative to combine these three separate flows 110 122, characterized by: (a) a zone of yellow; (b) a zone of blue and (c) a translucent zone. With reference to FIG. 11A (c) and FIG. 12, as this combined stream passes through the dynamic mixer pipe 108, the three zones of color are partially mixed together. Thus, other zones, green in color, may be created around the yellow and blue zones of the stream as well as around the translucent zones. Additional zones of color may also be created, located between the green zone and the yellow zone, as well as between the green zone and the blue zone. Upon its exit from the dynamic mixer 108, the stream of combined viscous material of viscous plastic may include a gradation in color from yellow to blue, and includes zone of different colors.

Note that the length of the dynamic mixer 108 that is necessary to obtain a partial mixing of the different colored zones of the stream of combined viscous material of viscous plastic may vary for different implementations of the system 100. The present invention is not limited to any specific length, or number of elements, for the dynamic mixer pipe 108.

The selection of an appropriate dynamic mixer 108 may be based on certain predetermined parameters, including the diameter, length, orientation of the elements themselves within the dynamic mixer 108, the range of rotational speeds of the elements of the dynamic mixer 108 and the possible direction(s) of the rotation of the dynamic mixer 108. Furthermore, the determination of the appropriate dimensions for the dynamic mixer 108 will depend on the type of plastic material in use within the system 100, as well as the respective rate of flow for each extruder 106 120₁, . . . , 120$_N$ and the total rate of flow for the stream of combined viscous material output by the feed block 104.

Note that as the elements of the dynamic mixer 108 adopt different orientations with respect to the longitudinal plane of the stream of combined viscous material result in different patterns of color gradation in the stream of combined viscous material at the output of the dynamic mixer pipe 108. For example, in the case of a helical dynamic mixer 108, when the last element of the dynamic mixer 108 is oriented horizontally with respect to the plane of the stream of combined viscous material, the dynamic mixer 108 will tend to produce longitudinal bands of color in the stream of combined viscous material. In contrast, when the last element is oriented vertically with respect to the plane of the stream of combined viscous material, the dynamic mixer 108 will tend to produce vertical or diagonal bands of color in the stream of combined viscous material. As elements of the dynamic mixer 108 are rotated, the bands of color in the stream of combined viscous material will vary between horizontal and vertical bands and may result in creating undulating color bands of combined viscous material. The angle, direction, speed and pattern of rotation of the elements of the dynamic mixer 108 may each impact the pattern of color gradation in the stream of combined viscous material at the output of the dynamic mixer pipe 108. In some implementations, at the exit of the dynamic mixer 108, the color bands may be twisted with one another in the stream of combined viscous material as a result of rotating of the elements of the dynamic mixer 108.

Furthermore, in some implementations, different rates of flow for the different extruders 106 120₁, . . . , 120$_N$, may produce colored zones of different sizes within the stream of combined viscous material. Thus, the resulting color pattern achieved in the stream of combined viscous material by the dynamic mixer 108, including both size and color dominance, may be dependent on the respective rate of flow of the extruders 106 120₁, . . . , 120$_N$, as well as on the behavior of the dynamic mixer 108.

In a specific, non-limiting example, in order to create a sheet of plastic having undulating color bands of red-orange-yellow once it has exited the dynamic mixer 108, a first extruder having a $3^{1/2}$ inch diameter at 50 rpm may be supplied with new plastic granules and 4% red colorant, and a second extruder having a $1^{1/2}$ inch diameter at 75 rpm may be supplied with new plastic granules and 4% yellow colorant. From the extruders, viscous flows of red and yellow plastic are fed into a feedblock that forms the flows of red and yellow plastic into a stream of adjacent zones, which it feeds into a helical dynamic mixer having a $2^{1/2}$ inch diameter made of 3 elements. In this specific non-limiting example, the specific radial orientation of the elements of the dynamic mixer 108 may be caused to vary repeatedly between a first rotational position threshold and a second rotational position threshold over a time interval by sequentially performing a clockwise and counter-clockwise rotation of the elements between these thresholds in order to create a stream having undulating color bands oriented along a longitudinal extent of the stream.

In another specific, non-limiting example, in order to create a sheet of plastic having a blue, white and light blue appearance once it has exited the dynamic mixer, a first extruder having a $3^{1/2}$ inch diameter is supplied with new plastic granules and 2% white colorant, and a second extruder having a $1^{1/2}$ inch diameter at 70 rpm is supplied with new plastic granules and 4% blue colorant. Optionally, the first extruder may be operated at a variable speed that fluctuates between about 12 rpm and 60 rpm over a 20 second time interval in order to further vary the color pattern of the eventual sheet. From the extruders, the flows of white and blue viscous plastic are fed into a feedblock that forms the two flows into a three layer stream of blue, white and blue which it feeds into a helical dynamic mixer having a $2^{1/2}$ inch diameter made of 6 elements. The specific radial orientation of the elements of the dynamic mixer may be caused to vary continuously by performing a clockwise (or counter-clockwise rotation) of the elements in order to create a stream having color bands oriented at an incline along a longitudinal extent of the stream.

The die 102 receives the stream of combined viscous material from the dynamic mixer pipe 108, and is operative to shape the stream of combined viscous material into its final product form, such as a sheet or a tube, among many other possibilities. In the non-limiting example shown in FIG. 1, the die 102 is operative to produce sheets of plastic 112 from the stream of combined viscous material. Different shapes and sizes of dies may be used within the system 100 to generate different forms and types of plastic products. The structure and functionality of such dies are well known to those skilled in the art, and as such will not be described in further detail herein.

Figure 13A:
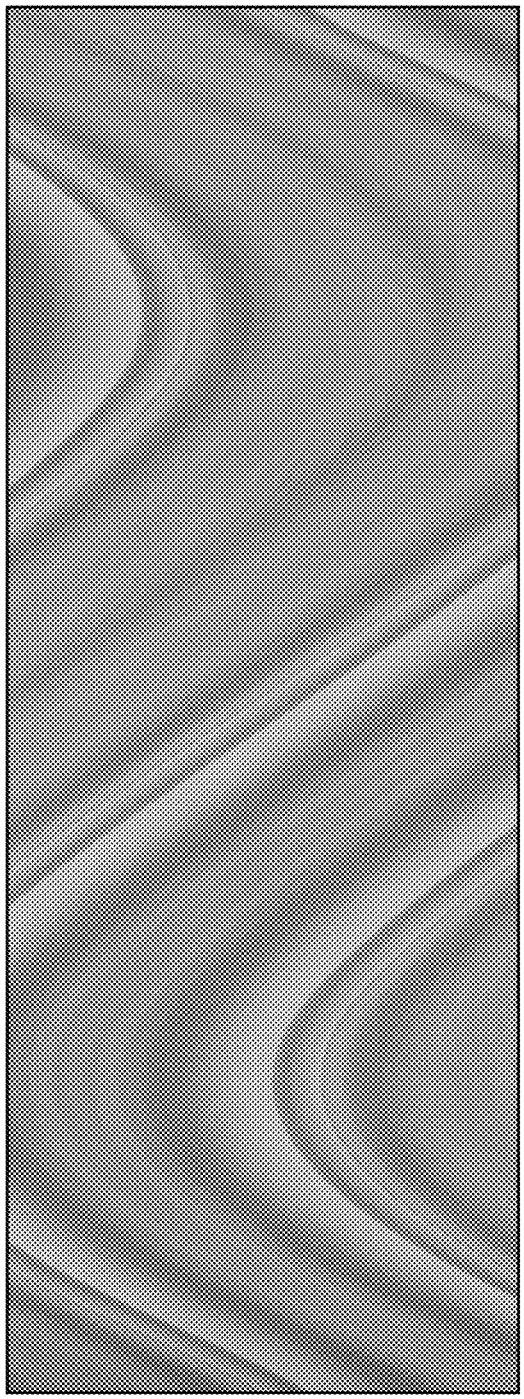
FIGS. 13A and 13B depict sheets of plastic having surfaces presenting color effects including color gradation effects having undulating color bands oriented along a longitudinal extent in accordance with non-liming examples of implementation of the invention.
Figure 13A:
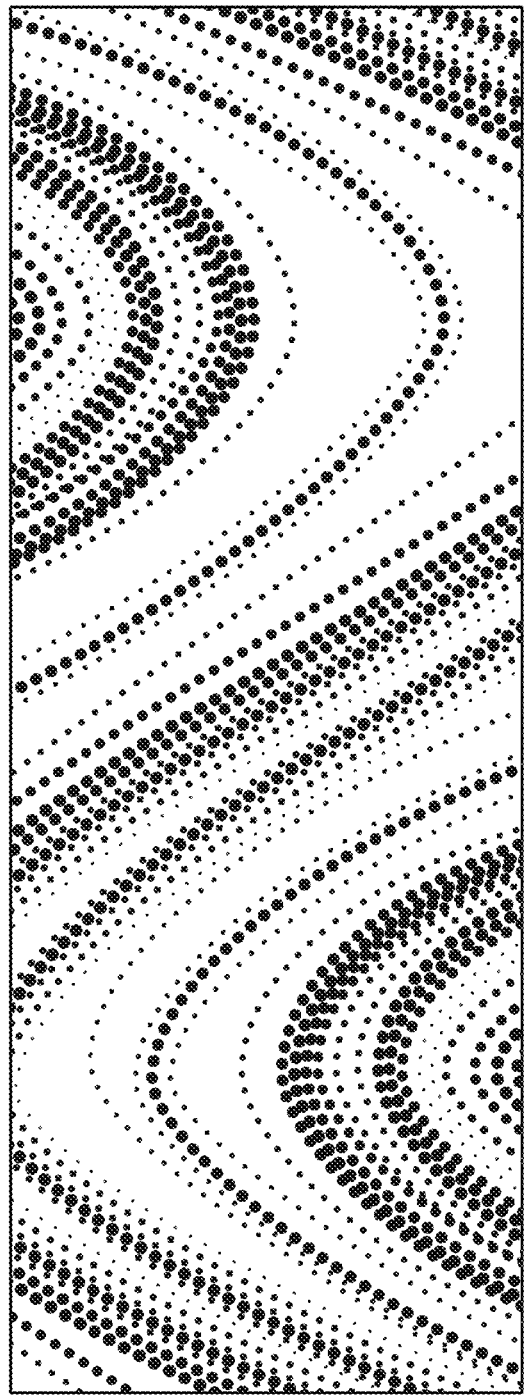
Figure 13B:
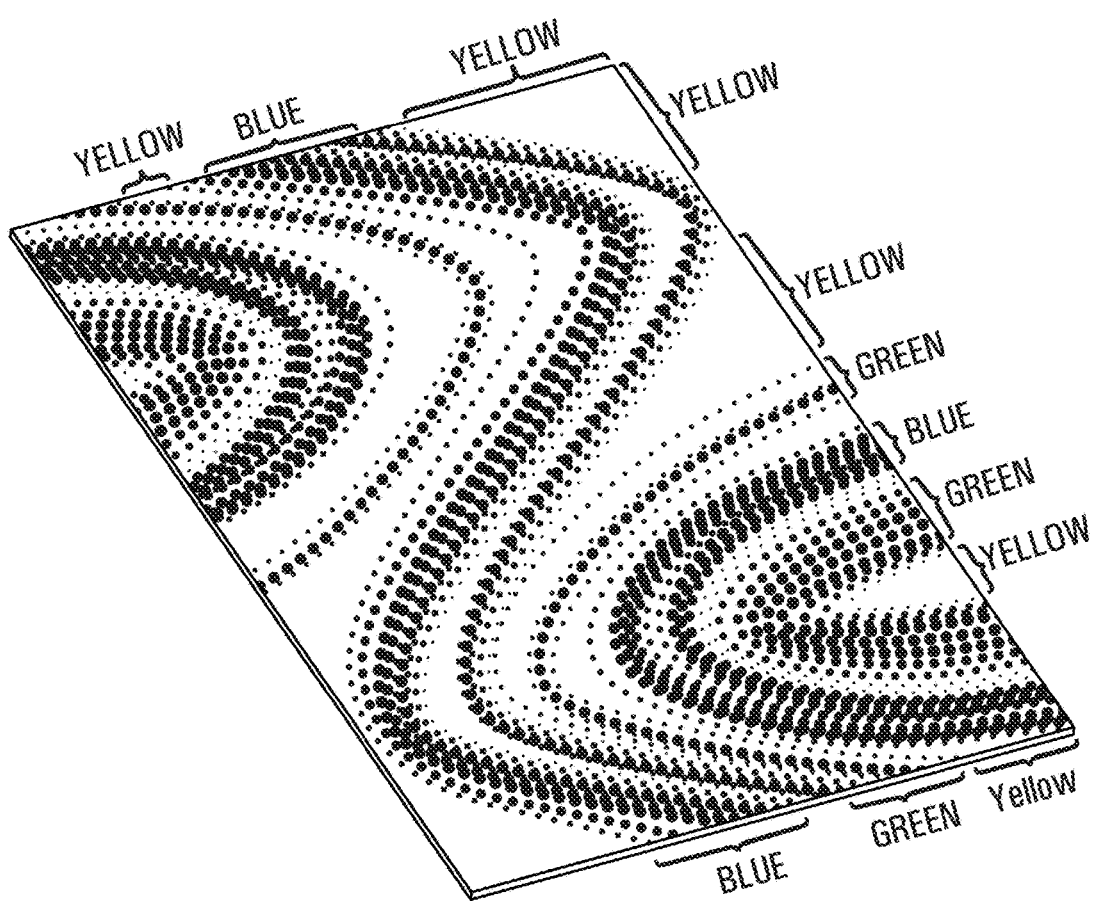
Figure 13C:
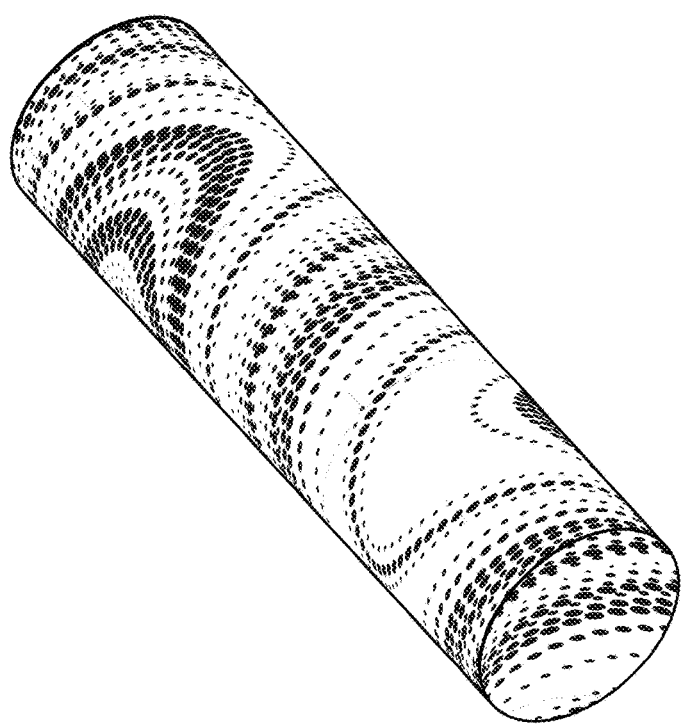
FIG. 13C depicts a tube of plastic with undulating color bands with color gradation effects, the undulations being oriented along a longitudinal extent of the tube in accordance with another non-liming example of implementation of the invention.

FIGS. 13A, 13B and 13C illustrate examples of products that may be formed by the die 102. In FIGS. 13A and 13B show examples of a sheet of plastic resulting from a three-color (translucent, yellow and blue) extrusion process. In its final product form, the sheet of plastic is characterized by color gradation effects including translucent zones (the color "A" from the first extruder 106), as well as undulating color bands of blue (the color "D" from extruder $120_1$), of yellow (the color "E" from extruder $120_N$) and green (resulting from a partial blending of color "D" and color "E"). In some specific implementations, sections of the sheet of extruded material taken along a longitudinal axis extending along the length of the extruded sheet may be characterized by undulating color bands oriented along a longitudinal extent of the sheet to create a wave-like pattern. In some other specific implementations, sections of the sheet of extruded material taken along a longitudinal axis extending along the length of the extruded sheet may be characterized by create color bands oriented at an incline along a longitudinal extent of the sheet to create a pattern with diagonally oriented color bands.

In FIG. 13C is shown an example of a tube of plastic resulting from the same three-color extrusion process.

Figure 13D:
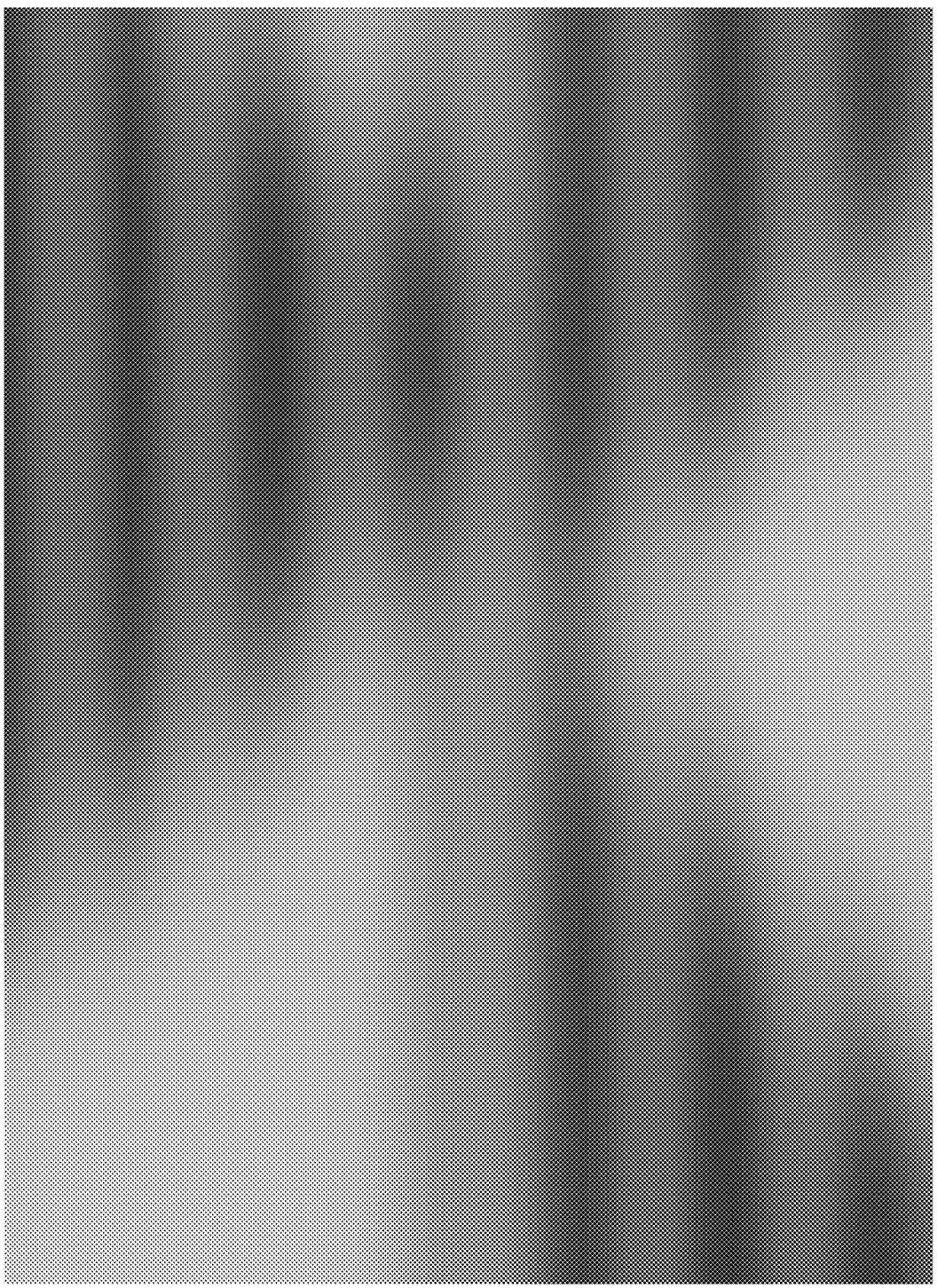
FIGS. 13D and 13E depict sheets of plastic having surfaces presenting color effects including color gradation effects in which the color transitions are oriented at an incline relative to a longitudinal extent of the plastic sheets in accordance with non-liming examples of implementation of the invention.
Figure 13E:
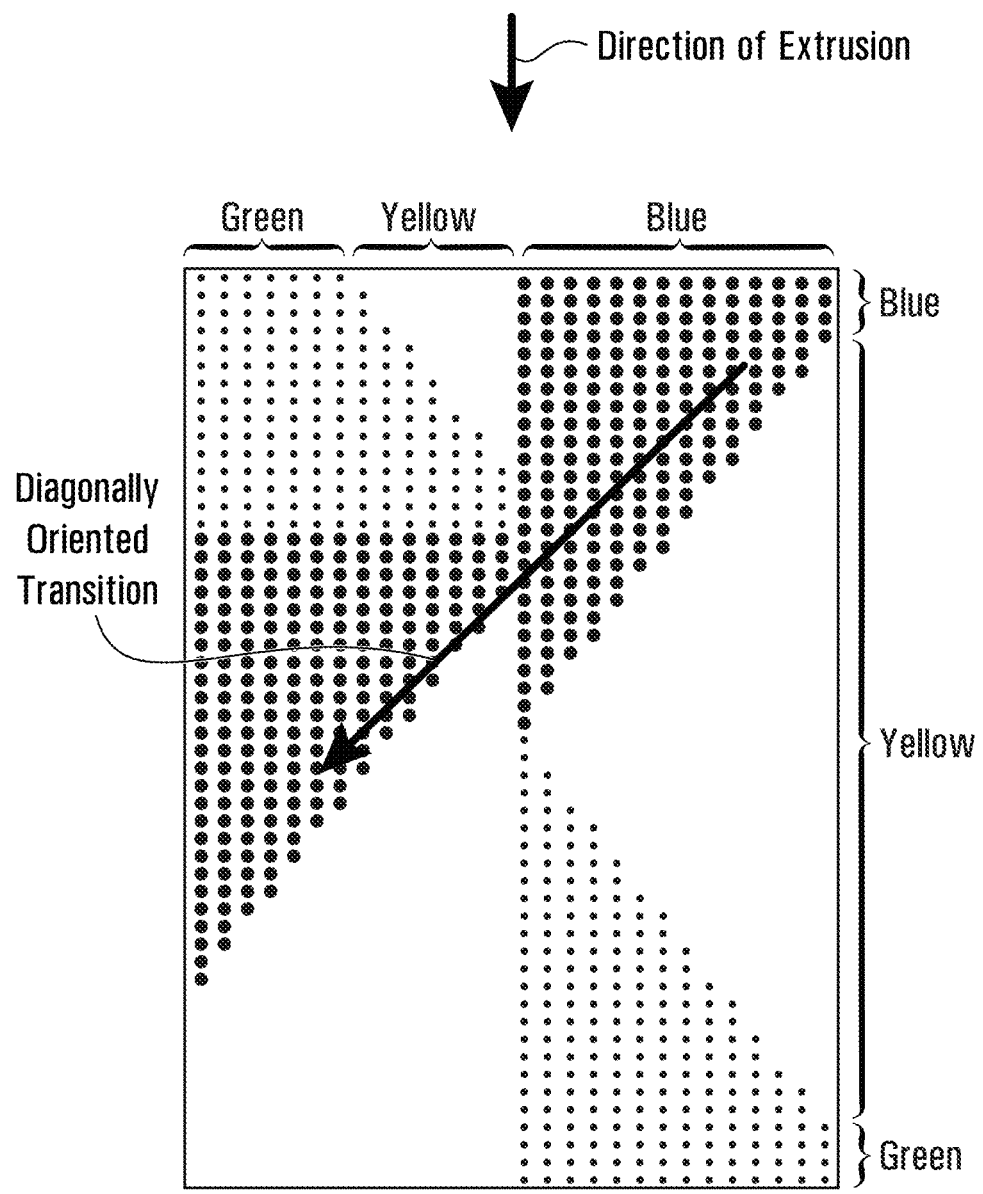

FIGS. 13D and 13E illustrate other examples of products that may be formed by the die 102.

In FIGS. 13A and 13B, the color bands are shown as undulating and in some section are generally diagonal relative to the longitudinal extent to the sheet. FIGS. 13D and 13E show examples of a sheet of plastic resulting from a three-color (translucent, yellow and blue) extrusion process. In its final product form, the sheet of plastic is characterized by color gradation effects including translucent zones (the color "A" from the first extruder 106), as well as undulating color bands of blue (the color "D" from extruder $120_1$), of yellow (the color "E" from extruder $120_N$) and green (resulting from a partial blending of color "D" and color "E"). In the specific example illustrated, the color transition or gradation occurs along an axis that is generally diagonal to the longitudinal extent to the sheet.

The product resulting from the extrusion process described in the present document, such as the sheet or tube of plastic, may be used as is, in different applications. For example, the sheets of plastic may be cut out to form tobogganing carpets, also referred to as crazy carpets. Alternatively, the product resulting from the extrusion process may be thermoformed into different shapes or final products. For example, the sheets of plastic characterized by undulating color band color gradation effects may be thermoformed into pedal boats, kayaks, canoes, stand-up paddle boards or other similar watercraft products. They may also be thermoformed into recreational products, such as toboggans and pools, among many other possibilities. Whether thermoformed or not, a main advantage of the extruded product resulting from the above-described extrusion process is to provide an esthetically appealing appearance to the consumer or user.

Figure 16A:
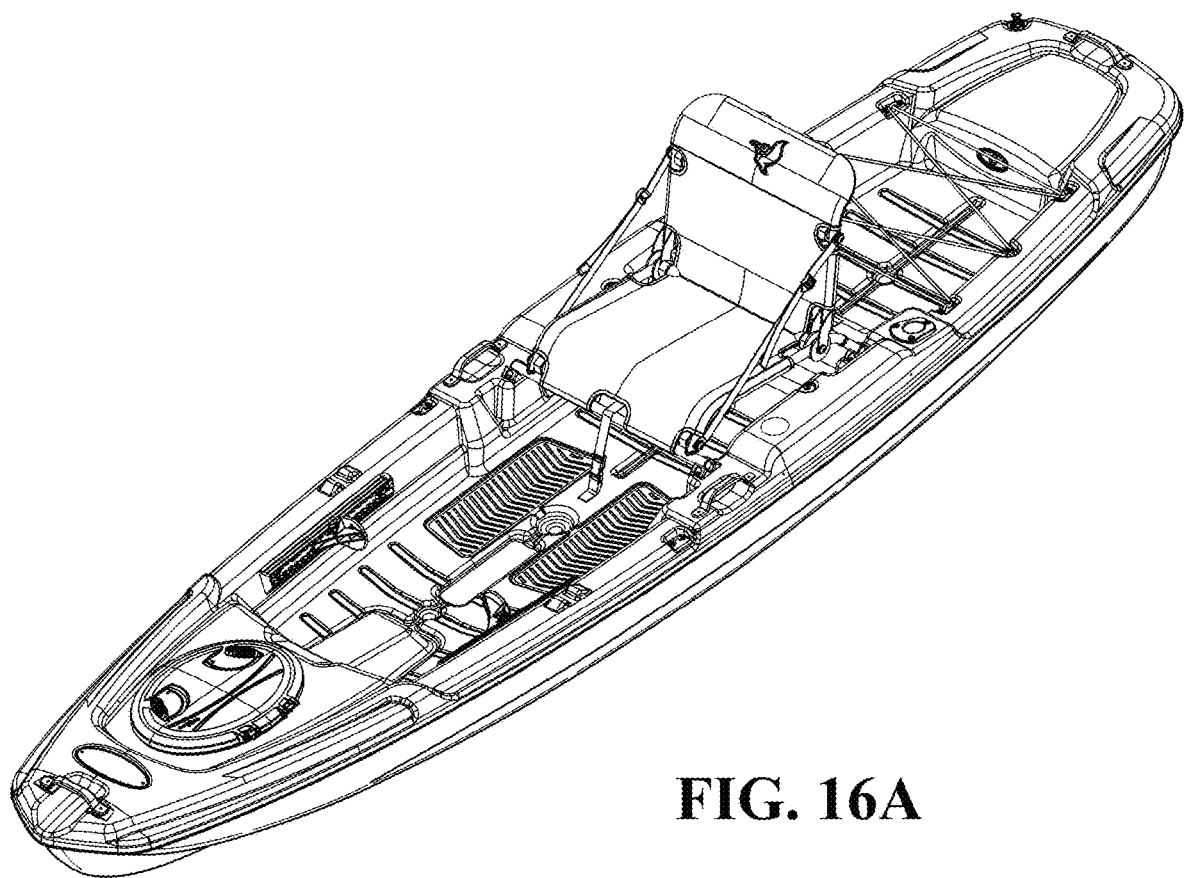
FIG. 16A shows a kayak manufactured using plastic sheets of extruded material created using a process embodying aspects of the invention.

FIG. 16A shows a kayak manufactured using one or more plastic sheets of extruded material with undulating color band color gradation effects created using a process embodying aspects of the invention described in the present document.

More specifically, a kayak of the type depicted in FIG. 16A may be manufactured by molding two or more of the manufactured sheets of extruded material using thermoforming to shape the two of more manufactured sheets into a kayak shape. In such process, one or more of the two or more of the manufactured sheets may have color effects created using a process embodying aspects of the invention described in the present document.

Figure 16B:
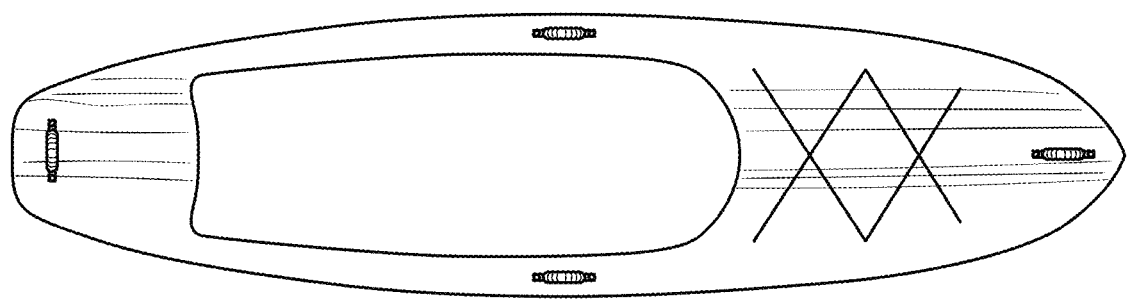
FIGS. 16B and 16C show top plan and side views respectively of a stand-up paddle board (SUP) manufactured using plastic sheets of extruded material created using a process embodying aspects of the invention.
Figure 16C:
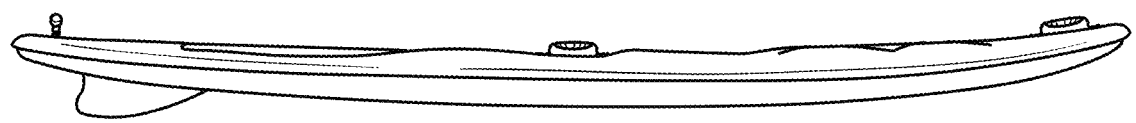

FIGS. 16B and 16C show top plan and side views respectively of a stand-up paddle board (SUP) manufactured using plastic sheets of extruded material created using a process embodying aspects of the invention described in the present document.

Figure 14:
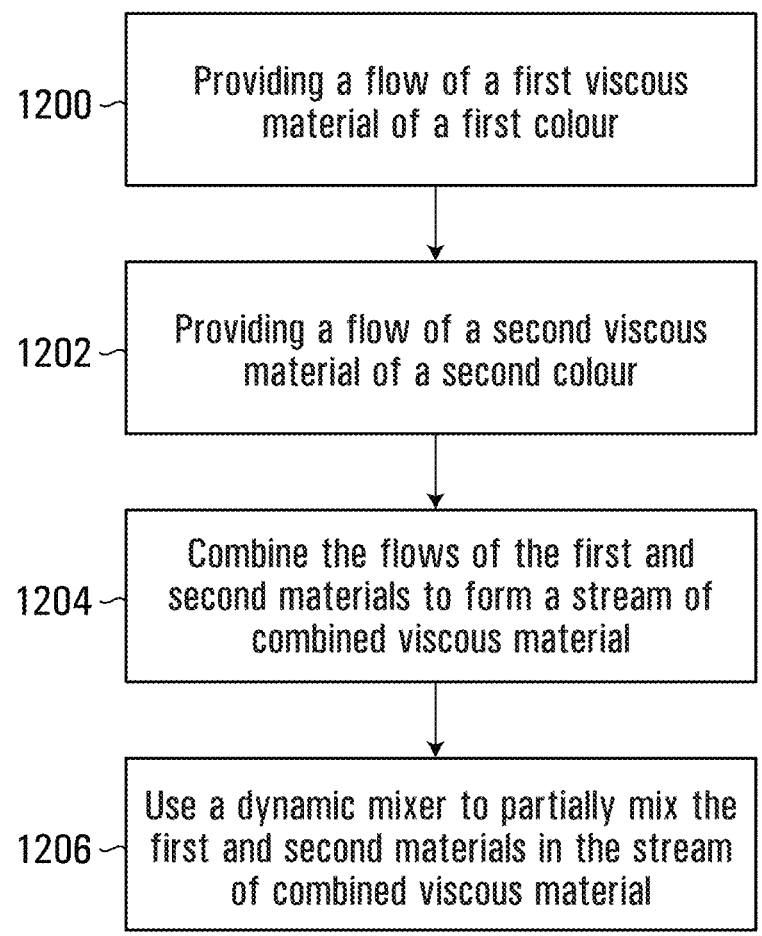
FIG. 14 is a flowchart illustrating a process for creating color effects using extrudable material according to an example of implementation of the present invention.

FIG. 14 is a flowchart illustrating a process that may be implemented by the system 100 for creating color gradation effects in extruded plastic material.

As shown, at step 1200, a flow of a first viscous material of a first color is provided through the primary extruder 106 (shown in FIG. 1). Optionally in some implementations, when providing the first viscous material (material "A"), the first rate of flow may be caused to vary over time. Varying the rate of flow of the first viscous material over time may allow modulating over time an amount of the first viscous material (material "A"), relative to an amount of the second viscous material (material "D") that finds itself in the stream of combined viscous material at different moments in time, which may allow the color effects created to vary over time.

Figure 5A:
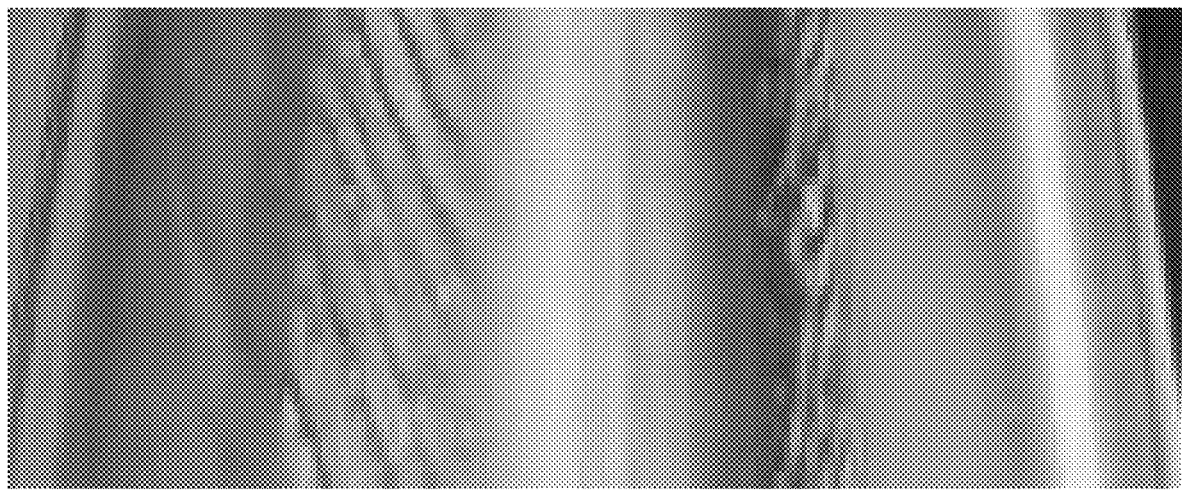
FIG. 5A shows color effects that may be produced using extrudable plastic material using a system of the type shown in FIG. 1 in which the flow rate controller maintains a constant flow rate.
Figure 5B:
FIG. 5B shows color effects that may be produced using extrudable plastic material using a system of the type shown in FIG. 1 in which the flow rate controller varies the flow rate over time of the material released by an extruder.

FIG. 5A shows color effects that may be produced using extrudable plastic material using the system 100 in which the flow rate controller 152 maintains a generated constant first flow rate in connection with extruder 106 (in other words no flow rate variation is applied to extruder 106). FIG. 5B shows color effects that may be produced using extrudable plastic material using the system 100 in which the flow rate controller 152 varies the flow rate of the extrudable material 1101. As can be observed, the modulation of the flow rate may allow creating wave-like color gradation effects in the resulting plastic material.

In one of the non-limiting practical embodiments contemplated, the first viscous material "A" is a base or carrier color. For example, the first viscous material "A" may be a translucent material and/or a neutral color such as a white (or off white), grey or any other suitable base of color.

At step 1202, which is performed concurrently with step 1200, a flow of a second viscous material of a second color, different from the first color, is provided through one of secondary extruders 120 (shown in FIG. 1). In some specific implementations, when providing the second viscous material (material "D"), the second rate of flow is kept substantially constant over time. It is however to be understand that this need not be the case in all implementations and that the second flow rate may also be caused to vary over time in a manner similar to that described above with reference to the flow of the first viscous material.

In some specific practical implementations, the second rate of flow associated with the second viscous material of the second color may be lower than the first rate of flow. In such implementations, the first viscous material ("A") constitutes a larger portion of the resulting stream of combined viscous material than the second viscous material ("D"). In specific practical implementations, the second rate of flow may be no more than 50% of the first rate of flow, preferably no more than 30% of the first rate of flow and more preferably no more than 20% of the first rate of flow.

In one of the non-limiting practical embodiments contemplated, the second viscous material "D" is an accent color intended to be carried by the base (or carrier color) of material "A". For example, the second viscous material "D" may be a bright colored material and such as a red, blue, pink, green, yellow or any other color that may add visual interest to the base (or carrier color) of material "A".

In some implementations, the second viscous material "D" provided at step 1202 may have a viscosity that is distinct from the viscosity of the first viscous material "A" to reduce an amount of color blending between the first color and the second color in the stream of combined viscous material.

At step 1204, the first and second flows are combined together in the feed block 104 (shown in FIG. 1) in a predetermined pattern to form a stream of combined viscous plastic.

Next, at step 1206, the stream of combined viscous plastic generated at step 1204 is fed through the dynamic mixer 108 (shown in FIG. 1), which is configured to partially mix the first viscous material ("A") and the second viscous material ("D") such that upon exiting the dynamic mixer, the first material of the first color and the second material of the second color form a color pattern in the stream of combined viscous material. In some cases, the color pattern created includes zones of the first color, zones of the second color and (optionally) zones of a third color, different from the first and second colors. The third color is typically a blend between the first color and the second color. In some specific implementations, the zones of different color are in the form of color bands and may include a first band of the first color, a second band of the second color and a third band of the third color. In some implementations, at the exit of the dynamic mixer 108, the first band, the second band and the third band are twisted with one another in the stream of combined viscous material and result in creating color bands of combined viscous material that may be diagonally oriented relative to a longitudinal extent of the stream.

Figure 17:
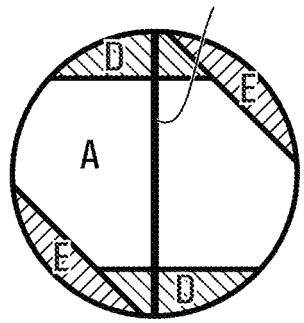
FIG. 17 illustrates effects of variations in rotational positions of a dynamic mixer on color gradations effects in accordance with a specific example of implementations of the invention.
Figure 17:
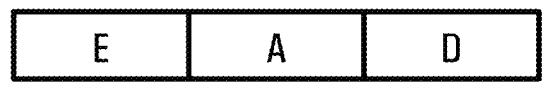
Figure 17:
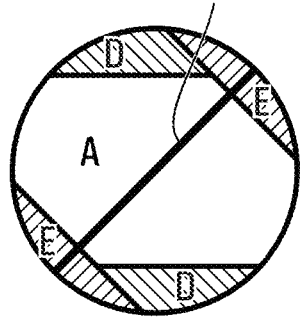
Figure 17:
Figure 17:
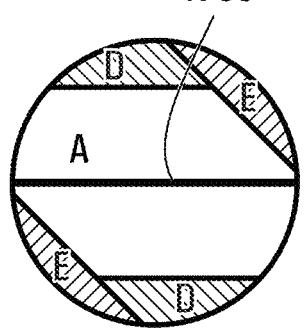
Figure 17:
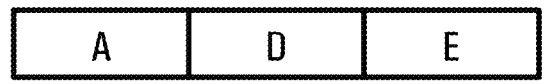

The effects of the varying rotational position of the dynamic mixer 108 on the color bands may be more clearly understood with reference to FIG. 17. As depicted, as the rotational position of the dynamic mixer 108 changes (illustrated on the left by the orientation of the radial oriental flight 1700), the order in which the first "A" color, second "D" color and third "E" color will appear on the plastic sheet will also change (as illustrated on the right of the Figure). In the example depicted as the radial orientation of the dynamic mixer 108 changes, the color bands ("A", "D" and "E") will diagonally transition (relative to the longitudinal extent of the sheet) until one or more of the bands disappear along a side (see color E on the left of the sheet which disappears in the image (3)).

In cases where, the second viscous material "D" provided at step 1202 has a viscosity that is distinct from the viscosity of the first viscous material "A", colors may tend to remain more true to the original first and second colors, and exhibit less color blending, than in cases where the viscosities of the first and second viscous materials are substantially the same.

Note that the above process may be applicable to various different suitable types of extruded material, and is not limited to plastic applications.

Figure 15:
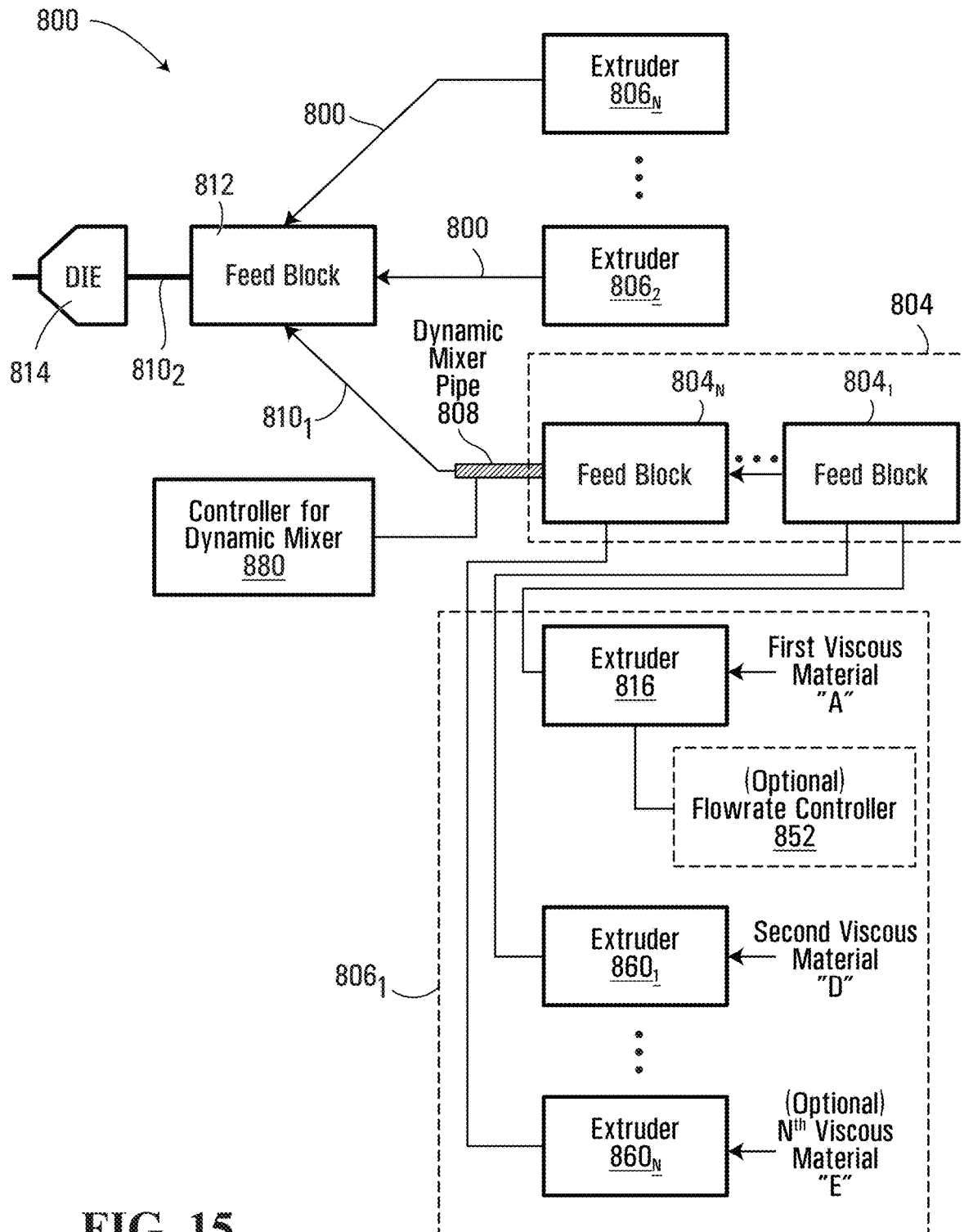
FIG. 15 depicts a system for manufacturing plastic sheets according to a variant of implementation of the present invention.

FIG. 15 depicts a system 800 for manufacturing plastic sheets, according to an alternative example of implementation of the present invention. As shown, system 800 is used for manufacturing plastic products, such as plastic sheets, with color effects being provided in one or more surface layers of the product. In this case, extruder 806₁, which includes extruders 816, 860₁, . . . , 860_N, in combination with the feed block 804 (which in this example is comprises of feed block sequence 804₁ . . . 804_N) and the dynamic mixer 808 connected to controller 880, produces a stream of combined viscous plastic 810₁ characterized by color effects, in a similar manner as described above with regard to the system 100 (shown in FIG. 1).

This stream 810₁ is then fed into a combining device where it is combined with the separate flows 800 of viscous plastic output by the extruders 806₂, . . . , 806_N. In the specific example shown in FIG. 15, the combining device includes the feed block 812. The feed block 812 produces a co-extruded stream of viscous plastic 810₂, having at least one layer, typically a surface layer, characterized by color effects. The die 814 then receives this co-extruded stream 810₂, and is operative to mold the plastic stream into its final form, for example a sheet or a tube.

Note that the feed blocks 804 and 812 may be similar in structure and functionality to that described above with regard to the feed block 104.

In an alternative embodiment wherein the die 814 is configured to combine the streams from the dynamic mixer pipe 808 and the extruders 806₂ 806_N into a co-extruded sheet prior to forming the sheet into its final form, the feedblock 812 can be omitted, and the combining device may simply include the die 814.

Thus, in this variant example of implementation, plastic products are formed in which the color effects may be limited to an outer surface of the product. Note that, in this case, one or more of the extruders 806₂, . . . 806_N may be fed with recycled plastic granules, if the respective one or more layers of plastic generated by these extruders are not visible on the finished product. Alternatively, each of the extruders 806₂, . . . 806_N may be producing a plastic mixture of a predetermined and specific color, depending on the specific applications and end products being formed.

Alternatively, the die 814 may be provided with multiple feed ports, such that the die 814 itself could directly receive the stream of viscous plastic 810₁ from the dynamic mixer 808, as well as the flows 800 from the extruders 806₂, . . . 806_N. Thus, the die 814 would act to combine the stream 810₁ and the flows 800 into the co-extruded stream of viscous plastic 810₂, after which the die 814 would shape the stream 810₂ into the final product form. Note that, in this case, the die 814 takes on the responsibility of the feed block 812, which is no longer required within the system 800.

Although various embodiments have been illustrated, this was for the purpose of describing, but not limiting, the invention. Various modifications will become apparent to those skilled in the art and are within the scope of this invention, which is defined more particularly by the attached claims.

The foregoing is considered as illustrative only of the principles of the invention. Since numerous modifications and changes will become readily apparent to those skilled in the art in light of the present description, it is not desired to limit the invention to the exact examples and embodiments shown and described, and accordingly, suitable modifications and equivalents may be resorted to. It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

Although the present invention has been described in considerable detail with reference to certain embodiments thereof, variations and refinements are possible and will become apparent to the person skilled in the art in view of the present description. The invention is defined more particularly by the attached claims.

What is claimed is:

1. A process for creating color effects using extrudable material, said process comprising:
   a) providing a flow of a first viscous material of a first color;
   b) providing a flow of a second viscous material of a second color different from the first color;
   c) combining in a predetermined pattern the flow of the first viscous material and the flow of the second viscous material to form a stream of combined viscous material, the stream comprising a first band of the first color and a second band of the second color, the second band being adjacent to the first band;
   d) feeding the stream of combined viscous material through a dynamic mixer configured for applying a dividing, overturning and combining motion to said stream of combined viscous material to partially mix the first viscous material and the second viscous material, such that upon exiting the dynamic mixer, the first viscous material of the first color and the second viscous material of the second color form a color pattern in the stream of combined viscous material, wherein said dynamic mixer has elements configured for acquiring a specific radial orientation in a range of radial orientations, said process comprising varying the specific radial orientation of the elements of the dynamic mixer by performing clockwise and counter-clockwise rotations of the elements of the dynamic mixer during the applying of the dividing, overturning and combining motion to the stream of combined viscous material to cause variations in the color pattern in the stream of combined viscous material to form an extruded material having a surface that presents color gradation effects having an undulating color pattern oriented along a longitudinal extent of the extruded material.

2. The process as defined in claim 1, wherein in the stream of combined viscous material the first band and second band remain and the stream of combined viscous material further comprises a third band of a third color that is different from the first and second colors.

3. The process as defined in claim 2, wherein the first band, the second band and the third band are twisted with one another in the stream of combined viscous material.

4. The process as defined in claim 1, wherein varying the specific radial orientation of the elements of the dynamic mixer includes performing a rotation of the elements of the dynamic mixer by a predetermined amount to vary the specific radial orientation of the elements of the dynamic mixer during the applying of the dividing, overturning and combining motion to the stream of combined viscous material.

5. The A process as defined in claim 4, wherein the rotation of the elements of the dynamic mixer by the pre-determined amount is performed repeatedly over time during the applying of the dividing, overturning and combining motion to the stream of combined viscous material.

6. The process as defined in claim 5, wherein the rotation of the elements of the dynamic mixer by the pre-determined amount is performed repeatedly at regular intervals over time during the applying of the dividing, overturning and combining motion to the stream of combined viscous material.

7. The process as defined in claim 4, wherein the rotation of the dynamic mixer by the pre-determined amount is a rotation by an angle of rotation greater than 0° and less than or equal to 360°.

8. The process as defined in claim 1, further includes varying a rotational position of the dynamic mixer over time including
   causing the rotational position to vary substantially continuously over a time interval between a first rotational position threshold and a second rotational position threshold.

9. The process as defined in claim 8, wherein said process comprises altering at least one of the first rotational position threshold and the second rotational position threshold in order to cause variations in the color pattern in the stream of combined viscous material.

10. The process as defined in claim 9, wherein altering the at least one of the first rotational position threshold and the second rotational position threshold includes modifying the at least one of the first rotational position threshold and the second rotational position threshold at least in part based on control commands provided by a user through a control interface.

11. The process as defined in claim 1, wherein the rotational position of the dynamic mixer has a rate of change over time defining a rotational speed of the dynamic mixer, wherein the rotational speed is greater than zero during the applying of the dividing, overturning and combining motion.

12. The process as defined in claim 11, wherein the rotational speed of the dynamic mixer remains substantially constant over time during the applying of the dividing, overturning and combining motion.

13. The process as defined in claim 11, wherein the rotational speed of the dynamic mixer varies over time during the applying of the dividing, overturning and combining motion.

14. The process as defined in claim 11, said process comprising processing control commands provided by a user over a control interface to set the rotational speed of the dynamic mixer.

15. The process as defined in claim 1, wherein:
   a) the flow of the first viscous material is associated with a first rate of flow, wherein providing the flow of the first viscous material of the first color includes varying the first rate of flow over time; and
   b) the flow the flow of the second viscous material is associated with a second rate of flow.

16. The process as defined in claim 1, wherein after applying the dividing, overturning and combining motion, said process includes the step of forming said stream of combined viscous material into a sheet.

17. The process as defined in claim 1, wherein after applying the dividing, overturning and combining motion, said process includes the step of forming said stream of combined viscous material into a tube.

18. The process as defined in claim 1, wherein after applying the dividing, overturning and combining motion, feeding the stream of combined viscous material through a die for forming a sheet of material comprising undulating color bands oriented along a longitudinal extent of the sheet.

* * * * *